(12) United States Patent
Bajic et al.

(10) Patent No.: US 7,529,203 B2
(45) Date of Patent: *May 5, 2009

(54) METHOD, SYSTEM AND APPARATUS FOR LOAD BALANCING OF WIRELESS SWITCHES TO SUPPORT LAYER 3 ROAMING IN WIRELESS LOCAL AREA NETWORKS (WLANS)

(75) Inventors: Zeljko Bajic, San Jose, CA (US); Sujai Hajela, Saratoga, CA (US)

(73) Assignee: Symbol Technologies, Inc., Holtsville, NY (US)

( * ) Notice: Subject to any disclaimer, the term of this patent is extended or adjusted under 35 U.S.C. 154(b) by 386 days.

This patent is subject to a terminal disclaimer.

(21) Appl. No.: 11/139,155

(22) Filed: May 26, 2005

(65) Prior Publication Data

US 2006/0268765 A1 Nov. 30, 2006

(51) Int. Cl.
 *H04Q 7/00* (2006.01)
(52) U.S. Cl. .................... 370/328; 370/230.1; 370/338; 455/445; 455/453
(58) Field of Classification Search ......... 370/328–329, 370/230, 395.5, 331, 338, 230.1; 455/436–439, 455/442, 445, 453
 See application file for complete search history.

(56) References Cited

U.S. PATENT DOCUMENTS

| | | | |
|---|---|---|---|
| 6,055,433 A | 4/2000 | Yuan et al. | |
| 6,404,772 B1 | 6/2002 | Beach et al. | |
| 6,795,701 B1 | 9/2004 | Baker et al. | |
| 6,901,270 B1 | 5/2005 | Beach | |
| 6,928,282 B2* | 8/2005 | Taniguchi | 455/433 |
| 7,113,498 B2 | 9/2006 | Bajic | |
| 7,173,922 B2 | 2/2007 | Beach | |
| 7,173,923 B2 | 2/2007 | Beach | |
| 7,403,516 B2* | 7/2008 | Sriram | 370/352 |
| 2001/0021175 A1* | 9/2001 | Haverinen | 370/230 |
| 2002/0021689 A1 | 2/2002 | Robbins et al. | |
| 2002/0067704 A1* | 6/2002 | Ton | 370/329 |
| 2002/0136226 A1 | 9/2002 | Christoffel et al. | |
| 2002/0176387 A1 | 11/2002 | Wilmer et al. | |
| 2003/0104814 A1 | 6/2003 | Gwon et al. | |

(Continued)

FOREIGN PATENT DOCUMENTS

EP 1117222 A1 7/2001

(Continued)

OTHER PUBLICATIONS

Droms Bucknell University R, "Dynamic Host Configuration Protocol," IETF Standard, Internet Engineering Task Force, ITEF, CH, Mar. 1997.

(Continued)

*Primary Examiner*—Alexander Eisen
*Assistant Examiner*—Wayne Cai

(57) ABSTRACT

Techniques are provided for load balancing among a plurality of wireless switches configured to support a plurality of clients including a first client. An initial home wireless switch can be configured to initially support the first client. The initial home wireless switch can select one of the wireless switches as a new home wireless switch for the first client. These techniques can be implemented, for example, in a wireless local area network.

10 Claims, 8 Drawing Sheets

U.S. PATENT DOCUMENTS

| | | |
|---|---|---|
| 2003/0128689 A1 | 7/2003 | Peirce, Jr. et al. |
| 2003/0135626 A1 | 7/2003 | Ray et al. |
| 2003/0179742 A1 | 9/2003 | Ogier et al. |
| 2003/0224788 A1 | 12/2003 | Leung et al. |
| 2004/0006708 A1 | 1/2004 | Mukherjee et al. |
| 2004/0047320 A1 | 3/2004 | Eglin |
| 2004/0095932 A1* | 5/2004 | Astarabadi et al. .......... 370/389 |
| 2004/0103282 A1 | 5/2004 | Meier et al. |
| 2004/0122976 A1 | 6/2004 | Ashutosh et al. |
| 2004/0214576 A1 | 10/2004 | Myers et al. |
| 2004/0221042 A1 | 11/2004 | Meier |
| 2005/0047420 A1 | 3/2005 | Shiro et al. |
| 2005/0074015 A1 | 4/2005 | Chari et al. |
| 2005/0213582 A1* | 9/2005 | Wakumoto et al. ....... 370/395.3 |
| 2005/0237962 A1 | 10/2005 | Upp et al. |
| 2006/0045069 A1 | 3/2006 | Zehavi et al. |
| 2006/0179307 A1 | 8/2006 | Stieglitz et al. |
| 2007/0121565 A1 | 5/2007 | Halasz et al. |

FOREIGN PATENT DOCUMENTS

| | | |
|---|---|---|
| EP | 1401151 | 3/2004 |
| EP | 1408653 | 4/2004 |
| EP | 1528747 | 5/2005 |
| WO | 0163943 | 8/2001 |
| WO | 0243348 | 5/2002 |
| WO | 03077429 | 9/2003 |
| WO | 03093951 | 11/2003 |
| WO | 03101131 | 12/2003 |
| WO | 2004/017172 A | 2/2004 |
| WO | 2004098143 | 11/2004 |
| WO | 2006066007 A | 6/2006 |

OTHER PUBLICATIONS

International Search Report for International Application No. PCT/US2006/014075 mailed Oct. 6, 2006.

International Search Report for International Application No. PCT/US2006/013888 mailed Nov. 8, 2006.

International Searching Authority, Annex to Form PCT/ISA/206 Communication Relating to the Results of the Partial International Search for International Application No. PCT/US2007/072350, mailed Nov. 22, 2007.

Ogier Sri International F. Templin Nokia M. Lewis Sri International R: "Topology Dissemination Based on Reverse-Path Forwarding (TBRPF); rfc3684.txt;" IETF Standard, Internet Engineering Task Force, IETF, CH, Feb. 2004, XP015009465; ISSN: 0000-0003; abstract; Chapters 5.1 and 7.

International Searching Authority, Annex to Form PCT/ISA/206 Communication Relating to the Results of the Partial International Search for International Application No. PCT/US2007/072556, mailed Dec. 28, 2007.

Annex to Form PCT/ISA/206, Communication Relating to the Results of the Partial International Search for International Application No. PCT/SU2007/073917, mailed Jan. 29, 2008.

Leary, Jonathan et al. "Wireless LAN Fundamentals Mobility," CISCO Press article, Jan. 9, 2004, pp. 1-8.

Symbol Technologies, Inc. "ES 3000 Ethernet Switch, Designed for Enterprise Wireless Networking Wireless Switch Environments," Oct. 2004.

Symbol Technologies, Inc. "What is a Wireless Switch and the Value of the Overlay Architecture?" Technical White Paper, Jan. 2005.

Symbol Technologies, Inc. Deutsch Messe AG Chooses the Wireless Switch System from Symbol Technologies to Power World's Largest Hotspot at CeBIT 203, Oct. 2003.

The Tolly Group "Wireless TCO: The Value of An Overlay Network," White Paper, Jun. 2004.

International Search Report for International Application No. PCT/US2006/014074 mailed Sep. 8, 2006.

International Search Report for International Application No. PCT/US2006/014076 mailed Sep. 18, 2006.

International Search Report for International Application No. PCT/US2006/020880 mailed Oct. 20, 2006.

International Search Report for International Application No. PCT/US2006/025356 mailed Nov. 30, 2006.

Dmitry Olshansky: "JPF Usage Tutorial (Demo application explained)" Internet Article, [Online] Mar. 9, 2005, pp. 1-7, XP002400718, JPF Homepage, Retrieved from the Internet: URL:http://web.archive.org/web/20050309192800/jpf.sourceforge.net/tutorial.html>, [retrieved on Sep. 27, 2006], p. 2, section "Preparing parameters to start up plug-in manager", paragraph 1-paragraph 3, p. 4, whole page.

Azad Bolour: "Notes on the Eclipse Plug-in Architecture" Internet Article, [Online] Jul. 10, 2003, pp. 1-26, XP002400728, Eclipse Homepage, Retrieved from the Internet: URL:http://web.archive.org/web/20030710042641/http://eclipse.org/articles/ Article-Plug-in-architecture/plugin_architecture. html> [retrieved on Sep. 27, 2006], p. 1, section "Introduction", paragraph 1-paragraph 2; p. 2, paragraph 1-paragraph 3; p. 3 section 2.3, paragraph 1-page 4, paragraph 7.

David Flanagan: "Java Foundation Classes in a Nutshell" Sep. 1999, O'Reilly & Associates, Inc., 101 Morris Street, Sebastopol, CA 95472, U.S.A., XP002400745, section 7.2.1, whole section.

Dmitry Olshansky: "Class StandardPathResolver" Internet Article, Mar. 9, 2005, XP002400737, JPF Homepage, section "resolvePath", whole section.

S. Glass, Sun Microsystems, Mobile IP Agents as DHCP Proxies, IETF Standard-Working-Draft, Internet Engineering Task Force, IETF, Ch. No. 1, Mar. 2, 2003 [abstract].

* cited by examiner

TO FIG. 9 OR FIG. 10

METHOD, SYSTEM AND APPARATUS FOR LOAD BALANCING OF WIRELESS SWITCHES TO SUPPORT LAYER 3 ROAMING IN WIRELESS LOCAL AREA NETWORKS (WLANS)

TECHNICAL FIELD OF THE INVENTION

The present invention generally relates to computer networks and, more particularly, to methods, systems and apparatus for load balancing of wireless switches in a Wireless Local Area Network (WLAN).

BACKGROUND OF THE INVENTION

WLANs, based on the IEEE 802.11 standards, have conventionally been used for ordinary Internet services such as web browsing, file transfers and electronic mail. However, with the emerging usage of real time multimedia applications such as voice over IP (VoIP) telephony, these same WLAN networks can also be used as infrastructure for enabling such applications. WLANs can give clients the ability to "roam" or physically move from place to place without being connected by wires. In the context of WLANs the term "roaming" describes the act of physically moving between access points (APs). One issue in the area of WLANs relates to the ability to maintain an IP-connection while roaming.

FIG. 1 is a block diagram of a conventional wireless local area network (WLAN). The WLAN 1 of FIG. 1 includes wireless clients 2, 4, a first subnet (A) 10, a wireless switch 12, access points (APs) 14, 16, a second subnet (B) 20, a wireless switch 22, access points (APs) 24, 26 and layer 3 routers 34, 36. The router 34 is coupled to the wireless switch 12. The wireless switch 12 supports the first subnet (A) 10 and is coupled to the access points (APs) 14, 16. The access points (APs) 14, 16 have IP addresses within the first subnet (A) 10. The router 36 is coupled to the wireless switch 22. The wireless switch 22 supports the second subnet (B) 20 and is coupled to the access points (APs) 24, 26. The access points (APs) 24, 26 have IP addresses within the second subnet (B) 20. The clients 2, 4 are wireless devices which physically move around the WLAN 1, and communicate with an IP network via the access points (APs) 14, 16 and access points (APs) 24, 26, respectively.

FIG. 1 illustrates the concept of layer 2 roaming and the concept of layer 3 roaming in the WLAN. A layer 2 network is defined as a single IP subnet and broadcast domain, such as the first subnet (A) 10, while a layer 3 network is defined as the combination of multiple IP subnets and broadcast domains, such as the first subnet (A) 10 and the second subnet (B) 20.

Layer 2 refers to the data link layer of the Open Systems Interconnection (OSI) communication model. The data link layer is concerned with moving data across the physical links in the network. In a network, the switch is a device that redirects data messages at the layer 2 level, using the destination Media Access Control (MAC) address to determine where to direct the message. In the context of the IEEE-802 LAN standards, the data link layer contains two sublayers called the Media Access Control (MAC) sublayer and the Logical Link Control (LLC) sublayer. The data link layer ensures that an initial connection has been set up, divides output data into data frames, and handles the acknowledgements from a receiver that the data arrived successfully. The data link layer also ensures that incoming data has been received successfully by analyzing bit patterns at special places in the frames.

Layer 2 roaming occurs when a client moves far enough away from its AP such that its radio associates with a different AP in the same subnet. The client disconnects from one Access Point (AP) and re-connects to another AP in the same subnet (broadcast domain) where several APs use the same Service Set Identifier (SSID). A client continuously listens to nearby APs and can decide to roam if it finds an AP with the same SSID and a stronger signal or is experiencing too much loss with the current AP. To initiate a layer 2 roam, the client sends an associate (or reassociate) request to the new AP. It may disassociate from the old AP, or the old AP may notice the client is no longer there.

IEEE's 802.11f Inter Access Point Protocol (IAPP) addresses roaming between Access Points (APs) inside client's home subnet and assures constant IP-connectivity in this case. With layer 2 roaming, APs inside a given subnet share the same Extended Service Set (ESS), and although the physical point of attachment (the AP) changes, the client is still served by the same Access Router. Because the original and the new AP offer coverage for the same IP subnet, the device's IP address is still valid after the roam and can remain unchanged. For example, when the roams within the first subnet (A) 10, the IP address of the client will remain the same.

After the client successfully roams, LAN traffic for the client can be relayed through the new AP. However, because the scalability of subnets is limited by the number of APs and clients that can be supported within a given subnet, in some situations the client roams to a new AP in a different or foreign subnet supported by another wireless switch. Because the client cannot be identified by its original home IP address anymore, a new IP address is required for the routing the client's IP data. Consequently, any on-going connections can be disrupted and IP connectivity can be lost. For applications like wireless VoIP phones or streaming applications, this is not acceptable.

Layer 3 refers to the network layer of the Open Systems Interconnection (OSI) multilayered communication model. The network layer is concerned with knowing the address of the neighboring nodes in the network, selecting routes and quality of service, and recognizing and forwarding to the transport layer incoming messages for local host domains.

Layer 3 roaming occurs when a client moves from an AP within its home IP subnet, such as the first subnet (A) 10, to a new AP within a foreign IP subnet, such as the second subnet (B) 20. This foreign IP subnet has a different Basic Service Set (BSS) than the home IP subnet. The client disconnects from one AP and reconnects or re-associates with another foreign AP in a foreign IP subnet outside its home IP subnet. In this re-association, the client is supposed to be served by a different access router (through the foreign AP), which bares a different IP address, while the client itself preserves its original IP address. At that point, the client would no longer have an IP address and default gateway that are valid within the foreign IP subnet. Therefore, if no other protocol is implemented to address an L3 roam, the client will not able to send/receive IP packets from/to its current location. As a result, active IP sessions can be dropped because IP-connectivity is lost.

To prevent existing data sessions or voice calls from failing because the remote client can no longer reach the local client, processes called "IP handoff" or "L3 handover" can be used to preserve the IP traffic to/from the client after such re-association with the foreign AP. Because this process is not addressed by current IEEE nor Wi-Fi standards, important functions, such as preservation of the client's IP connectivity upon a layer 3 handover, have yet to be standardized.

Nevertheless, some vendors of WLANs have developed solutions which can allow layer 3 roaming to occur by providing mechanisms for a client to obtain a new IP address. For instance, if the client roams across a boundary between the first subnet (A) 10 and the second subnet (B) 20 and a Dynamic Host Configuration Protocol (DHCP) is enabled on the client, then the client can use DHCP to obtain a new IP address of the second subnet (B) 20. As used herein, the "Dynamic Host Configuration Protocol (DHCP)" refers to a protocol for assigning dynamic IP addresses to devices on a network. DHCP typically sends a new IP address when a computer is plugged into a different place in the network. This protocol allows a device to have a different IP address every time it connects to the network, and the device's IP address can even change while it is still connected. DHCP can also support a mix of static and dynamic IP addresses. DHCP uses the concept of a "lease" or amount of time that a given IP address will be valid for a computer. Using very short leases, DHCP can dynamically reconfigure networks in which there are more computers than there are available IP addresses.

However, layer 3 traffic re-routing requires more than updating MAC address tables and ARP caches. Many applications require persistent connections and drop their sessions as a result of inter-subnet roaming. Network layer devices such as routers and layer 3 switches must somehow be told to forward IP packets to the client's new subnet. To provide session persistence, mechanisms are needed to allow a client to maintain the same Layer 3 address while roaming throughout a multi-subnet network. Otherwise, many applications will timeout trying to reach the client's old IP and must be reconnect with the client's new IP.

One way to support layer 3 roaming in WLANs is via an open IETF standard called Mobile IP. Mobile IP provides one solution for handling the L3 movements of clients regardless of the underlying layer 2 technology.

In the context of Mobile IP, the client is referred to as a mobile node (MN). In the description that follows, these terms are used interchangeably. Mobile IP uses a Home Agent (HA) to forward IP packets to a Foreign Agent (FA) in the client's new subnet. The HA and FA advertise themselves using the ICMP Router Discovery Protocol (IRDP). The Foreign Agent periodically advertises its presence wirelessly and waits for a solicitation message from a roaming mobile node. When a Mobile IP-enabled client roams to a new subnet, it must discover and register itself with a nearby FA. The registration process for such a node is triggered by a wireless registration request (after the 802.11 association is completed) issued by the MN. The FA forwards that request to that client's original HA. Wired messages can then be exchanged between the HA and the FA as well as with binding table updates. An acknowledgment can then be sent wirelessly to the MN.

If the request is accepted, a tunnel is established between the HA and FA to relay incoming packets sent to the client's original IP address. The HA serves as the anchor point for communication with the wireless client. It tunnels packets from Corresponding Nodes (CNs) towards the current address of the MN and vise versa. Outbound packets are routed back through the tunnel from the FA to HA, and then on to their destination.

Although Mobile IP preserves subnet connectivity for roaming clients, it can result in sub-optimal routing and longer roaming delay. As noted above, the wireless client must first regain over the air connectivity with its new FA before the Agent Discovery Phase is launched. This can result in considerable reconnection time which increases latency. Furthermore, the registration process involves wire line and wireless communication. The amount of packet loss and the significant delay introduced during these procedures make the method unsuitable for many WLAN applications, such as VoIP over 802.11 or streaming over 802.11.

Notwithstanding these advances, as new applications emerge and are implemented, such as VoIP over 802.11, changes to the WLAN deployment are required. For example, coverage-oriented deployments must move to capacity-oriented deployments characterized by low user to AP ratio and more APs in a given coverage area. The move to capacity-oriented deployments emphasizes the need for techniques that allow clients to roam across subnets and roaming domains.

There is a need for layer 3 roaming techniques which can allow a client to roam across different IP subnets of a WLAN while preserving the client's original IP-connection and original IP address. It would be desirable if such techniques could allow the client to perform a seamless and smooth L3 handoff between APs of different IP subnets, while maintaining an active session without losing IP connectivity. It would be desirable if such techniques could enable routing of IP data to/from the client's current foreign subnet to their original IP address and home subnet even though the client is currently in a foreign subnet. It would also be desirable to provide layer 3 roaming techniques which can eliminate the need to re-key during re-authentication.

In some deployment scenarios, a WLAN will be deployed in a large area and supports a large number of clients on a number of wireless switches. Due to the location and distribution of the wireless switches, there can be an increased likelihood that one of the wireless switches will be assigned as the home wireless switch to a disproportionately large number or percentage of mobile clients in the WLAN. For example, a WLAN deployed at a park might have a number wireless switches. In this scenario, a first wireless switch might be located, for example, at a park, mall, stadium or other location where a large percentage of the clients will power on their 802.11 devices at the entrance. As a result the first wireless switch can become the home wireless switch of a large percentage of the clients such that it supports a disproportionately large number of the clients. When these clients roam the first wireless switch will remain as the home wireless switch for those clients, and the traffic to and from these clients will be tunneled back to first wireless switch indefinitely regardless of the client's location and proximity to other wireless switches in the WLAN. As a result, it is possible that the first wireless switch will get overloaded while some other wireless switches in the WLAN may be handling a relatively light load.

It would be desirable to provide techniques which allow the first wireless switch to determine that it should no longer remain as the home wireless switch for a certain client or clients when those clients move away from the first wireless switch. Techniques are needed to allow the first wireless switch to determine that it is no longer the best home wireless switch for a particular client or clients. Techniques are also needed to balance the number of clients assigned to a particular wireless switch such that the load on each of the wireless switches in the WLAN becomes more balanced.

Other desirable features and characteristics of the present invention will become apparent from the subsequent detailed description and the appended claims, taken in conjunction with the accompanying drawings and the foregoing technical field and background.

SUMMARY OF THE INVENTION

According to one embodiment, techniques are provided for load balancing wireless switches in wireless local area network comprising a plurality of wireless switches configured to support a plurality of clients including a first client. An initial home wireless switch can be configured to initially support the first client. The initial home wireless switch can select one of the wireless switches as a new home wireless switch for the first client.

BRIEF DESCRIPTION OF THE DRAWINGS

The present invention will be described in conjunction with the following drawing figures, wherein like numerals denote like elements.

DETAILED DESCRIPTION OF THE INVENTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description. As used herein, the word "exemplary" means "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

Embodiments of the present invention provide methods and apparatus that allow for a client to roam from a first subnet to a second subnet while keeping the same IP address used in the home subnet. As used herein, a "client" is a mobile device in a WLAN. The term "mobile device" can generally refer to a wireless communication device or other hardware with which an access network communicates. At a given time a mobile device may be mobile or stationary and can include devices that communicate through a wireless channel or through a wired channel. A mobile device may further be any of a number of types of mobile computing devices including but not limited to a laptop computer, a PC card, compact flash, external or internal modem, wireless or wireline phone, personal digital assistant (PDA) or mobile telephone handset.

Figure 1:
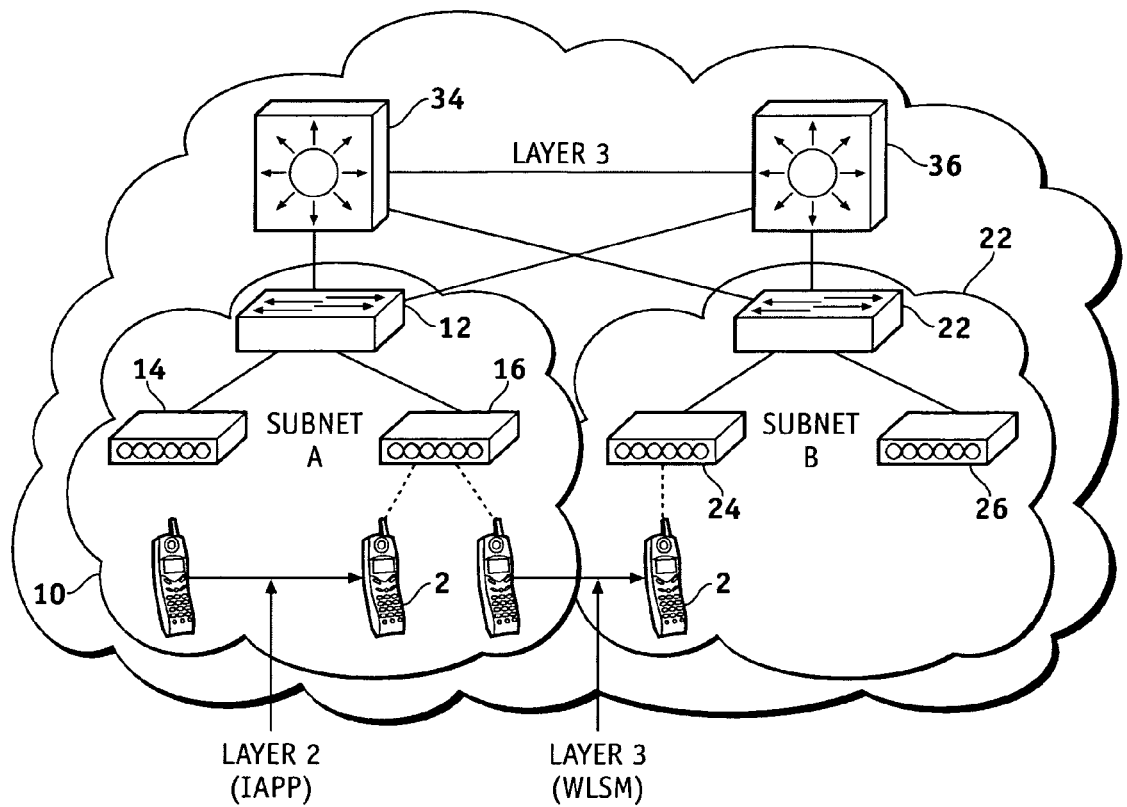
FIG. 1 is a block diagram of a conventional wireless local area network (WLAN) which illustrates the concept of layer 2 roaming and the concept of layer 3 roaming in the WLAN.
Figure 2:
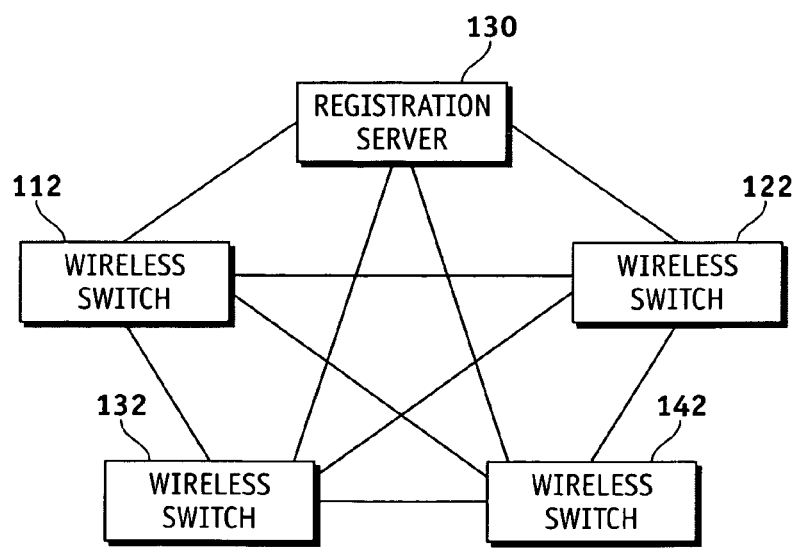
FIG. 2 is a block diagram of a WLAN according to one exemplary embodiment which implements a registration server and a plurality of wireless switches.

FIG. 2 is a block diagram of a WLAN according to one exemplary embodiment which implements a registration server 130 and wireless switches 112, 122, 132, 142. As used herein, the term "WLAN" refers to a network in which a mobile user can connect to a local area network (LAN) through a wireless (radio) connection. The IEEE 802.11 standard specifies some features of exemplary wireless LANs.

As used herein, the term "packet" refers to a unit of data that is routed between an origin and a destination on a packet-switched network such as the Internet. When any file is sent from one place to another on the Internet, the Transmission Control Protocol (TCP) layer divides the file into "chunks" of an efficient size for routing. Each of these packets is separately numbered and includes the Internet address of the destination. The individual packets for a given file may travel different routes through the Internet. When they have all arrived, they are reassembled into the original file by the TCP layer at the receiving end. In the context of the User Datagram Protocol (UDP), it should be appreciated that the term "datagram" has a similar meaning to the term "packet."

As used herein, the term "switch" refers to a device that channels incoming data from any of multiple input ports to the specific output port that will take the data toward its intended destination. A switch typically performs the data-link or layer 2 function and determines, from an IP address in each packet, which output port to use for the next part of its trip to the intended destination. The destination address generally requires a look-up in a routing table by a device known as a router. In some embodiments, the switch can function as an IP switch which may also perform network or layer 3 routing functions.

The registration server 130 and wireless switches 112, 122, 132, 142 can be coupled to each other via IP sockets or tunnels which the wireless switches 112, 122, 132, 142 create to the registration server 130. The wireless switches 112, 122, 132, 142 are coupled to each other by a mesh network of IP sockets or tunnels. As used herein, the term "tunneling" refers to the process of allowing two disparate networks to connect directly to one another when they normally would not or when they are physically disjointed. Tunneling is synonymous with encapsulation, and is generally done by encapsulating private network data and protocol information within public network transmission units so that the private network protocol information appears to the public network as data. A tunnel requires an entry point and an exit point. The entry point encapsulates the tunneled packets within another IP header. The new IP header might include some other parameters, but the basic function of the encapsulation header is to direct the packet to the tunnel endpoint. A packet received by the tunnel endpoint is stripped of the encapsulation header and forwarded to the client.

The registration server 130 is a network entity that can be implemented as dedicated hardware on an external high availability platform. For example, the registration server 130 might be implemented in a blade server. Alternatively, the registration server 130 can be implemented as a module hosted on two wireless switches.

The registration server 130 is used for registering wireless switches in the WLAN when the wireless switches join the WLAN. The registration server 130 has a first Internet Protocol (IP) address which is configured on every wireless switch in the WLAN. As used herein, the term "Internet Protocol (IP) address" refers to a layer 3 address. Each communication from a user on the Internet carries an IP address of the source and destination networks and the particular machine within the network associated with the user or host computer at each end. In one implementation, the IP address is a 32-bit address comprising one part identifies the network with a network number and another part which identifies the specific machine or host within the network with a host number. Some of the bits in the machine or host part of the address can be used to identify a specific subnet. In this case, the IP address then contains three parts: the network number, the subnet number, and the machine number.

Each of the wireless switches 112, 122, 132, 142 has configuration information associated with it which can include, for example, an IP address and a list of subnets (IP domains) which the particular wireless switch supports. As used herein, the term sub-network or "subnet" refers to an identifiably separate part of a network. Typically, a subnet may represent all the machines at one geographic location, in one building, or on the same wireless local area network (WLAN). One standard procedure for creating and identifying subnets is described in Internet Request for Comments (RFC) 950.

Each of the wireless switches 112, 122, 132, 142 registers with the registration server 130 by communicating its configuration information to the registration server 130 and uses the IP address of the registration server 130 to create or open a first IP socket (tunnel) to the registration server 130. The wireless switches 112, 122, 132, 142 can periodically send update messages to each other. These update messages can include, for example, changes to the configuration information associated with each wireless switch.

The registration server 130 can use the configuration information to create an AWSL which includes a listing of each of the wireless switches 112, 122, 132, 142 in the WLAN. The registration server 130 sends the AWSL to each of the wireless switches 112, 122, 132, 142. Each of the wireless switches 112, 122, 132, 142 uses the AWSL to open a UDP/IP socket to each of the other wireless switches 112, 122, 132, 142. Once all of the wireless switches 112, 122, 132, 142 are coupled together via UDP/IP sockets and are coupled to the registration server 130 via IP sockets, the mesh network is complete. This mesh network changes dynamically as new switches are added (e.g., register with the registration server 130) or removed from the WLAN.

In one implementation, each of the wireless switches 112, 122, 132, 142 can send configuration information to each of the other wireless switches 112, 122, 132, 142. Alternatively, the registration server 130 can send the configuration information for each of the wireless switches 112, 122, 132, 142 to each of the other wireless switches 112, 122, 132, 142.

The wireless switches 112, 122, 132, 142 can also periodically send update messages to each other. If a certain amount of time passes and one of the wireless switches do not send update messages, then the other wireless switches can assume that wireless switch is no longer in the WLAN.

Typically, any communications between the registration server 130 and the wireless switches 112, 122, 132, 142 over the IP sockets are unencrypted. However, in another embodiment, if security is a concern, the IP sockets (tunnels) can go over a security protocol, such as Internet Protocol Security (IPSec), and the communications can be encrypted using IPSec. "Internet Protocol Security (IPSec)" refers to a framework for a set of security protocols at the network or packet processing layer of network communication. IPsec can allow security arrangements to be handled without requiring changes to individual user computers. IPsec provides two choices of security service: Authentication Header (AH), which essentially allows authentication of the sender of data, and Encapsulating Security Payload (ESP), which supports both authentication of the sender and encryption of data as well. The specific information associated with each of these services is inserted into the packet in a header that follows the IP packet header. Separate key protocols can be selected, such as the ISAKMP/Oakley protocol. As will be described below, the client 202 can use IPSec terminated on the home wireless switch 212.

In another embodiment, it may be desirable to deploy redundant registration servers. When multiple registration servers 130 are implemented the configuration of the active or master registration server 130 can be synchronized with the configuration of a standby or slave registration server. That way, in the event the active or master registration server 130 fails, the standby or slave registration server can take over since it includes the same information (e.g., wireless switch list, active client list) as the active or master registration server 130.

In addition to the functionality related to the L3 roaming in WLANs, other functionality can be implemented in the registration server 130 that is typically implemented in other external servers. For example, the registration server 130 can host wireless intrusion detection system (WIDS) functionality, location server functionality, billing functionality, etc. Because the registration server 130 has information about each wireless switch (e.g., wireless switch list) and each client (e.g., active client list) in the WLAN, the registration server 130 can leverage this information with other functions provided by the additional functionality.

Figure 3:
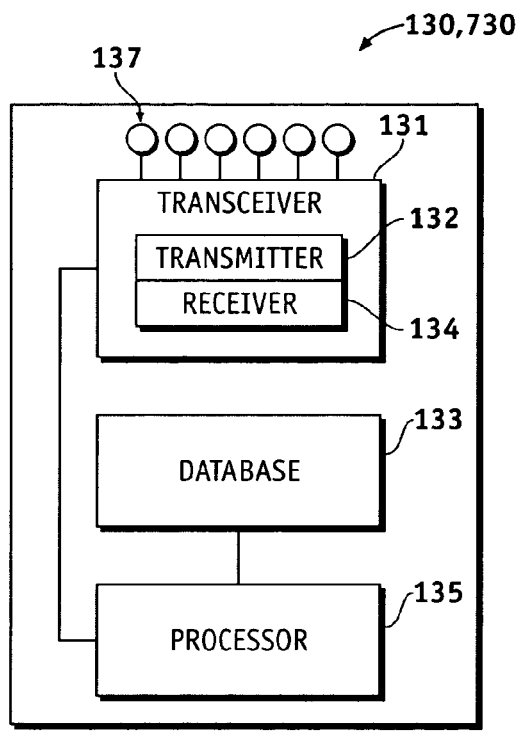
FIG. 3 is a block diagram of a registration server according to one exemplary embodiment.

FIG. 3 is a block diagram of a registration server 130 according to one exemplary embodiment. The registration server 130 can include, for example, a transceiver 131 which includes a transmitter 132 and a receiver 134, a database 133, a processor 135 and a number of ports 137.

The receiver 134 of the registration server 130 can communicate the IP address of the registration server 130 to each of the wireless switches. Each of the wireless switches can use the IP address to open an IP socket to one of the ports. The receiver 134 receives configuration information from each wireless switch that includes attributes and parameters associated with each of the wireless switches 112, 122, 132, 142. This configuration information is communicated over a set of first IP sockets or tunnels between each of the wireless switches 112, 122, 132, 142 and the registration server 130. The configuration information for each wireless switch 112, 122, 132, 142 comprises a switch IP address and a list of subnets (IP domains) which the wireless switch supports. The processor 135 registers each of the wireless switches 112, 122, 132, 142 with the registration server 130 using the configuration information received from the wireless switches 112, 122, 132, 142 during registration and, optionally, updates received from the wireless switches 112, 122, 132, 142. The processor 135 can use the configuration information communicated received from the wireless switches 112, 122, 132, 142 to create an active wireless switch list (AWSL). The AWSL includes a listing of each of the wireless the switches in the WLAN. The transmitter 132 subsystem can communicate the configuration information for each of the wireless switches and the AWSL to each of the wireless switches. Each of the wireless switches can use the configuration information and the AWSL to open a UDP/IP socket to each of the other wireless switches. The database 135 can store the configuration information for each of the plurality of wireless switches and the AWSL.

Figure 4:
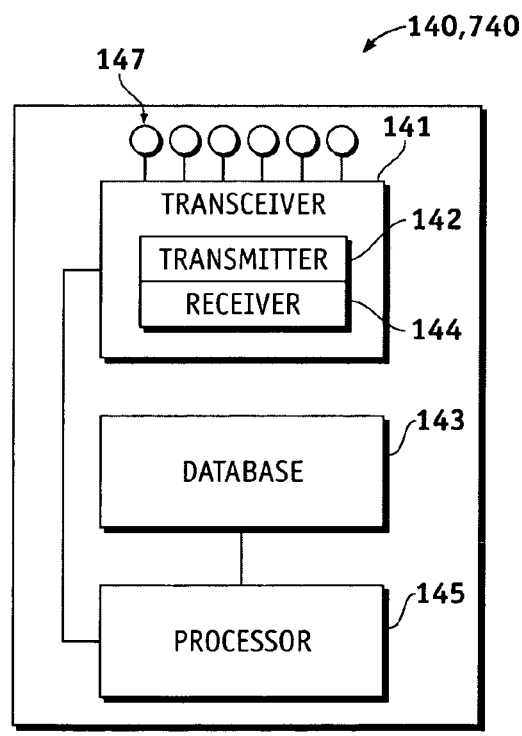
FIG. 4 is a block diagram of a wireless switch according to one exemplary embodiment.

FIG. 4 is a block diagram of a wireless switch 140 according to one exemplary embodiment. The wireless switch 140 could be implemented as any or all of the wireless switches 112, 122, 132, 142 described above. The wireless switch 140 can include, for example, a transceiver 141 which includes a transmitter 142 and a receiver 144, a database 143, a processor 145 and a number of ports 147.

The transmitter 142 can communicate configuration information about the wireless switch 140 to a registration server over an IP socket to the registration server 130. The transmitter 142 can also send configuration information for the wireless switch 140 to each of the other wireless switches.

The receiver 144 can receive configuration information for each of the other wireless switches and a copy of the AWSL which includes a listing of each of the other wireless switches in the WLAN.

The processor 145 can use the configuration information and the AWSL to open a UDP/IP sockets from the ports 147 to each of the other wireless switches.

The transmitter 142 can send the update messages for the wireless switch to each of the other wireless switches. The receiver 144 can also receive update messages from each of the other wireless switches. These update messages comprise changes to configuration information for each of the other wireless switches.

Figure 5:
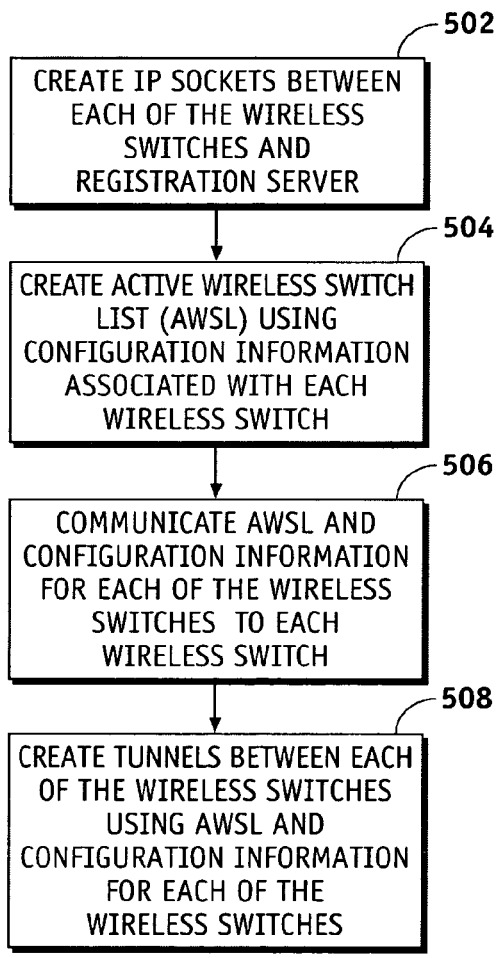
FIG. 5 is a flow chart showing an exemplary method creating a mesh network of wireless switches according to one exemplary embodiment.

FIG. 5 is a flow chart showing an exemplary method creating a mesh network of wireless switches in a WLAN comprising a wireless switches 112, 122, 132, 142 and a registration server 130. An IP address of the registration server 130 can be configured on each of the wireless switches 112, 122, 132, 142.

At step 502, the IP address of the registration server 130 can be used to create or open an IP socket from each of the wireless switches 112, 122, 132, 142 to the registration server 130. Each of the wireless switches 112, 122, 132, 142 can register with the registration server 130 by communicating configuration information about each of the wireless switches 112, 122, 132, 142 to the registration server 130. In one implementation, the configuration information for each switch 112, 122, 132, 142 comprises a switch IP address and a list of subnets the switch supports.

At step 504, the registration server 130 can use the configuration information to create an active wireless switch list (AWSL) which includes a listing of each of the wireless switches 112, 122, 132, 142 in the WLAN.

At step 506, the AWSL and the configuration information for each of the wireless switches 112, 122, 132, 142 can then be communicated to each of the wireless switches 112, 122, 132, 142.

At step 508, each of the wireless switches 112, 122, 132, 142 can use the configuration information and the AWSL to open a UDP/IP socket to each of the other wireless switches 112, 122, 132, 142. Each wireless switch is then connected to each of the other wireless switches 112, 122, 132, 142 and a mesh network of wireless switches 112, 122, 132, 142 is created.

In other implementations, each of the wireless switches 112, 122, 132, 142 can send configuration information to each of the other wireless switches 112, 122, 132, 142. Alternatively, the registration server 130 can send the configuration information and the AWSL for each of the wireless switches 112, 122, 132, 142 to each of the other wireless switches 112, 122, 132, 142. Each wireless switch 112, 122, 132, 142 can also send update messages to each of the other wireless switches 112, 122, 132, 142. These update messages can include, for example, changes to configuration information for each wireless switch 112, 122, 132, 142.

Figure 6:
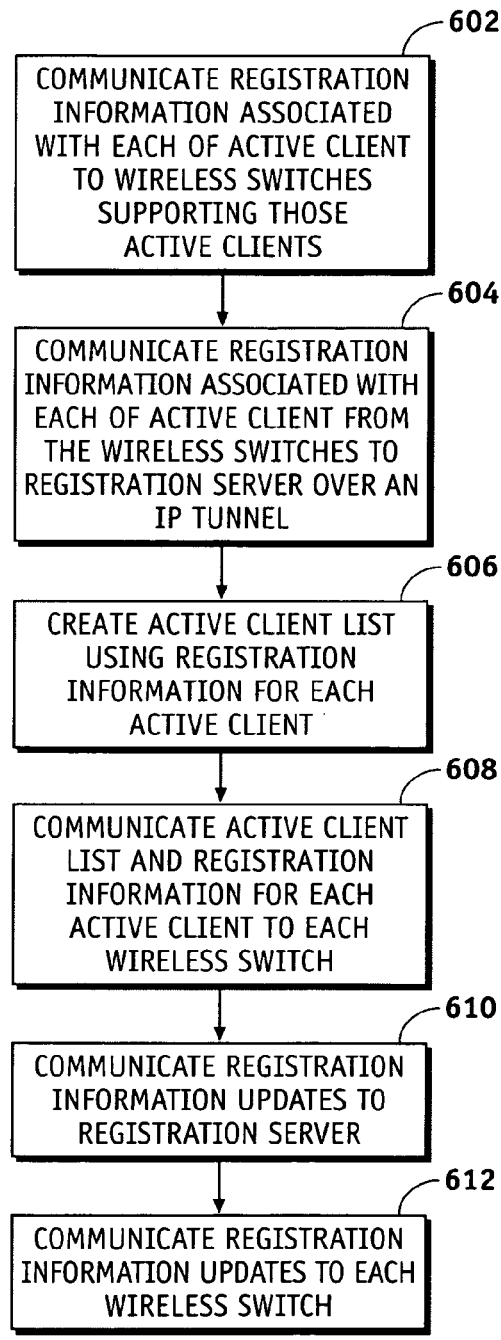
FIG. 6 is a flow chart showing an exemplary method for providing an active client list to a plurality of wireless switches according to one exemplary embodiment.

FIG. 6 is a flow chart showing an exemplary method for providing an active client list (ACL) to a plurality of wireless switches 112, 122, 132, 142 according to one exemplary embodiment. The wireless switches 112, 122, 132, 142 can be located, for instance, in a WLAN such as the WLAN of FIG. 2 comprising a registration server 130 and a plurality of active clients (not shown) supported by the wireless switches 112, 122, 132, 142.

At step 602, registration information associated with each of the active clients is communicated to the wireless switches 112, 122, 132, 142 that support those active clients. At step 604, the registration information associated with each of the active clients is communicated from the wireless switches 112, 122, 132, 142, over an IP tunnel, to the registration server 130. At step 606, an active client list can be created using the registration information for each active client. The active client list comprises a record for each active client in the WLAN. The record of each client comprises a MAC address of the client, a client IP address of the client, a home switch of the client, a visited switch of the client, inactivity timers for the home switch and the visited switch and location information. At step 608, the active client list and the registration information for each active client is communicated to each wireless switch 112, 122, 132, 142. At step 610, registration information updates are communicated from each wireless switch 112, 122, 132, 142 to the registration server 130. The registration server 130 can use the registration information updates received from the wireless switches 112, 122, 132, 142 to update the active client list. At step 612, the registration information updates are communicated to each of the other wireless switches 112, 122, 132, 142 in the WLAN. Alternatively, the registration server 130 can communicate an updated active client list including the registration information updates to the active client list to each wireless switch 112, 122, 132, 142.

Referring again to FIG. 3, the registration server 130 can include ports 137, a transceiver 131 comprising a transmitter 132 and a receiver 134, a processor 135, a database 133. Selected ports couple the registration server 130 to the wireless switches 112, 122, 132, 142 via IP sockets. The receiver 134 can receive registration information for each active client from the wireless switch that supports each active client. The processor 135 can create an ACL using the registration information for each active client. The database 135 can store the ACL and registration information for each active client, and the transmitter 132 can communicate the ACL and registration information for each active client to each wireless switch. In one implementation, the wireless switches send registration information updates. The receiver 134 can receive registration information updates from the wireless switches, and the processor 135 can use the registration information updates to create an updated ACL. The transmitter 132 can then send the registration information updates to each of the wireless switches. In another implementation, the wireless switches send registration information updates to the receiver 134, and the processor 135 can use the registration information updates to update the ACL. The transmitter 132 can send the registration information updates to the ACL to each wireless switch 112, 122, 132, 142 as the registration information updates are received from the wireless switches 112, 122, 132, 142.

Referring again to FIG. 4, each of the wireless switches 112, 122, 132, 142 can include, for example, a number of ports 147, a transceiver 141 including a transmitter 142 and a receiver 144, a processor 145 and a database 143. The receiver 144 can receive registration information from each of the active clients the wireless switch supports. The ports 247 couple the wireless switches 112, 122, 132, 142 to the registration server 130 via IP sockets. The transmitter 142 transmits the registration information to the registration server 130. The receiver 144 can receive the ACL from the registration server 130. The ACL comprises a record for each of the active clients in the WLAN. The receiver 144 can also receive registration information updates from each of the active clients the wireless switch supports, and the transmitter 142 can send the registration information updates to the registration server 130. The transmitter 142 can also send the registration information updates to each of the other wireless switches in the WLAN. The receiver 144 can receive an updated ACL from the registration server 130 which includes the registration information updates received from each of the wireless switches.

L3 Mobility and WLAN Load Balancing

In one embodiment, the registration server 230 or the switches can monitor the inactivity timers. If the inactivity timers of the client 202 indicate that the client 202 is inactive on its home switch (and the visited switch) for a given period of time, then the registration server 230 forces the client 202 to 802.11 reauthenticate and reassociate and get a new client IP address on a new wireless switch. This allows the WLAN to avoid transmitting unnecessary overhead and cleans up unnecessary traffic in the tunnels between switches.

Figure 7:
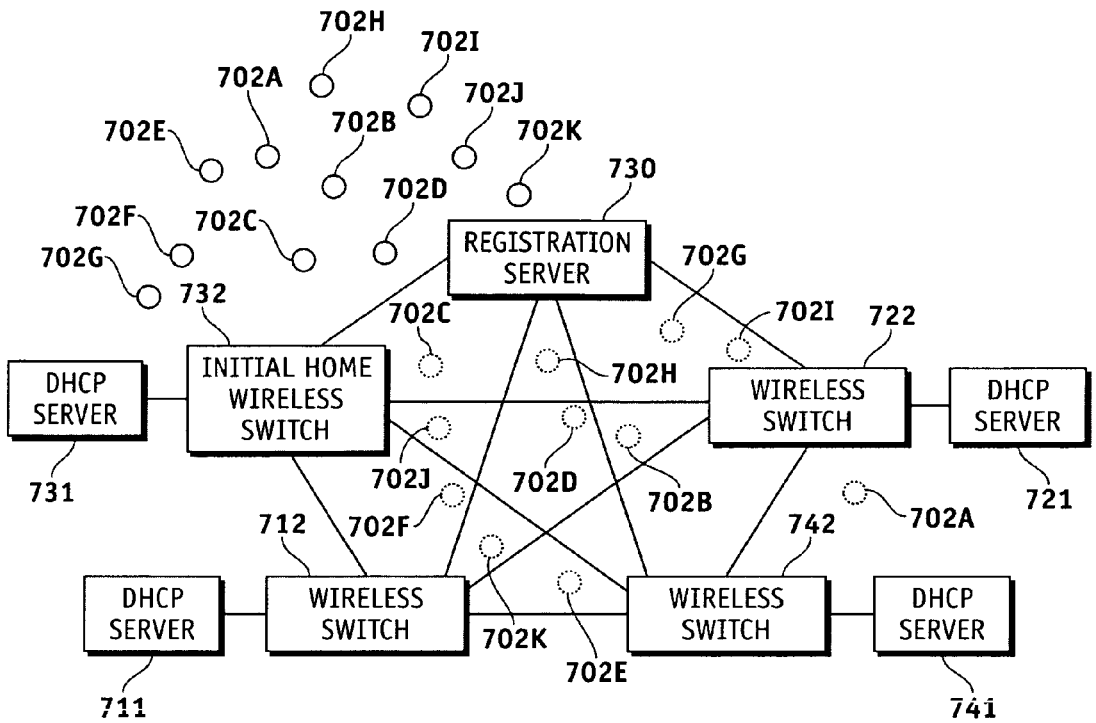
FIG. 7 is a block diagram of a WLAN according to one exemplary embodiment which implements a registration server and a plurality of wireless switches including an original home wireless switch of a client.

FIG. 7 is a block diagram of a WLAN according to one exemplary embodiment which implements a registration server 730 and a plurality of wireless switches 712, 722, 732, 742 including an original home wireless switch 732 of a client 702A. Each of the wireless switches 712, 722, 732, 742 has a DHCP server 711, 721, 731, 741 associated with it. In conjunction with this embodiment, techniques for WLAN load balancing will now be described.

To illustrate the techniques for WLAN load balancing, the following example assumes that wireless switch 732 is a client's original home wireless switch and is relatively overloaded with clients with respect to at least one of the other wireless switches 712, 722, 742. After a given client 702A gets 802.11 authenticated/associated, and 802.1x authenticated on the original home wireless switch 732, the client 702A will send a DHCP request to the original home wireless switch 732. If the original home wireless switch 732 becomes overloaded with other clients, it may no longer be practical for the original home wireless switch 732 to remain the home wireless switch for this client 702A. To address this problem, the original home wireless switch 732 can forward a DHCP request to another wireless switch 712, 722, 742 in the network which is likely or definitely determined to be less loaded with clients 702A-702K than the original home wireless switch 732. Before forwarding the DHCP request to another wireless switch in the WLAN, the original home wireless switch 732 should determine which wireless switch 712, 722, 732, 742 in the WLAN is the best candidate to become the new home wireless switch for the client 702A. The original home wireless switch 732 can select either itself or any of the other wireless switches 712, 722, 742 to forward the DHCP request to. This selection can be accomplished by a number of different methods. In the description of FIGS. 7-11 which follows, the original home wireless switch 732 is assumed to be overloaded with clients 702A-702K or client traffic with respect to the other wireless switches 712, 722, 742 such that at least one of the other wireless switches is currently handling less traffic that the original home wireless switch 732. Therefore the original home wireless switch 732 will select one of the other wireless switches 712, 722, 742 as a new home wireless switch and forward the DHCP request to the other wireless switch 712, 722, 742 which is selected. Nevertheless, in a given situation, it should be appreciated that the original home wireless switch 732 could select itself as a new home wireless switch if it determines that it is currently the least loaded wireless switch in the WLAN.

In this embodiment, the original home wireless switch 732 can determine which of the other wireless switches 712, 722, 742 in the WLAN is the best candidate to become the new home wireless switch for the client 702A by selecting the wireless switch handling the least amount of traffic based on attributes in a traffic load records (TLRs) associated with each of the wireless switches 712, 722, 742 in the WLAN. This mechanism for selecting a new home wireless switch from a number of candidate wireless switches 712, 722, 742 can run continuously or it can be triggered when the original home wireless switch 732 exceeds predefined traffic load threshold (TLT).

Each of the wireless switches 712, 722, 732, 742 can periodically report a traffic load record (TLR) to the registration server 730. For a given wireless switch, the TLR can contain, for example, information concerning the number of clients a given switch supports as a home switch, the number of clients the given switch supports as a visited switch, the amount of traffic (Mb/s) being tunneled to the given switch (since it is home switch for some clients), the amount of traffic (Mb/s) tunneled from the given switch (since it is visiting switch for some clients), and the amount of traffic (Mb/s) being transferred by the given switch.

The registration server 730 can use the TLRs from each of the wireless switches 712, 722, 732, 742 to generate a network load report (NLR) which includes information about traffic load of each of the wireless switches 712, 722, 732, 742 in the WLAN. The registration server 730 can periodically distribute the NLR to each of the wireless switches 712, 722, 732, 742 in the WLAN. In one embodiment, the NLR may comprise a system traffic load table (STLT) which includes information from the TLRs of each of the wireless switches 712, 722, 732, 742 in the WLAN.

The original home wireless switch 732 can use the NLR, and attributes from the TLRs for each of the other wireless switches, to determine which of the other wireless switches 712, 722, 742 in the WLAN is currently handling the least amount of traffic, and select that switch as the best candidate to become the new home wireless switch for the client 702A. Once the original home wireless switch 732 selects one of the other wireless switches 712, 722, 742, such as wireless switch 722, as the new home wireless switch for the client 702A, then the original home wireless switch 732 can also redirect any DHCP requests received from a new client or clients (not known by the network; with no home switch being assigned) to new home wireless switch.

The original home wireless switch 132 can randomly determine which of the other wireless switches 712, 722, 742 in the WLAN will become the new home wireless switch for the client 702A. For example, the original home wireless switch 732 can hash the client's MAC address and optionally some other data from a DHCP request packet to determine a hash value. The hash value can have a range of values. For example, in the WLAN implementation of FIG. 7 where four wireless switches are used, the hash value (x) can be between 0 and 256. The hash value (x) may be determined by the following equation:

$$x = MAC[0] XOR\ MAC[1] XOR\ MAC[3] XOR\ MAC[4]\ XOR\ MAC[5] XOR\ MAC[6]$$

Once the hash value (x) is determined, then the original home wireless switch 732 can use it to determine which of the wireless switches 712, 722, 732 742 should be assigned as the client's new home wireless switch. For example, in one possible implementation, if the hash value (x) is less than 64, then the wireless switch 712 can become the new home wireless switch; if the hash value (x) is greater than or equal to 64 and less than 128, then wireless switch 722 will become the new home wireless switch; if the hash value (x) is greater than or equal to 128 and less than 192, then wireless switch 732 will remain as the new home wireless switch; and if the hash value (x) is greater than or equal to 192 and less than 255, then wireless switch 742 will become the new home wireless switch.

Thus, according to this implementation, the home switch is assigned by the hashing algorithm and the traffic load is randomly balanced. Depending on the hash value (x) that is determined, it is possible that the original home wireless switch 732 will be selected or remain as the client's new home wireless switch. However, the new home wireless switch assigned by hashing algorithm can already be overloaded. In another implementation, when the original home wireless switch 732 is known to be overloaded, the original home wireless switch can select one of the other wireless switches 712, 722, 742.

If the original home wireless switch 732 decides, for instance, that wireless switch 122 is the best candidate to become the new home wireless switch, then the original home wireless switch 732 can forward a DHCP request to wireless switch 722. A DHCP server (not shown) which is connected to the wireless switch 722 can then assign an IP address to the client 702A and become the client's new home wireless switch. New home wireless switch 722 will tunnel a DHCP response to the original home wireless switch 732. The original home wireless switch 732 then becomes this client's visited wireless switch and wireless switch 722 becomes client's new home wireless switch. All traffic coming from this client 702A will be tunneled to the new home wireless switch 722. Once the client 702A roams to another switch in the WLAN such as wireless switch 712, wireless switch 712 will become the new visited wireless switch and wireless switch 722 will remain as the home switch. All traffic for this client 702A is tunneled to new home wireless switch 722 by the new visited wireless switch 712. At this point, original home wireless switch 732 which first accepted the connection from this client 702A no longer handles this client's traffic.

Figure 8:
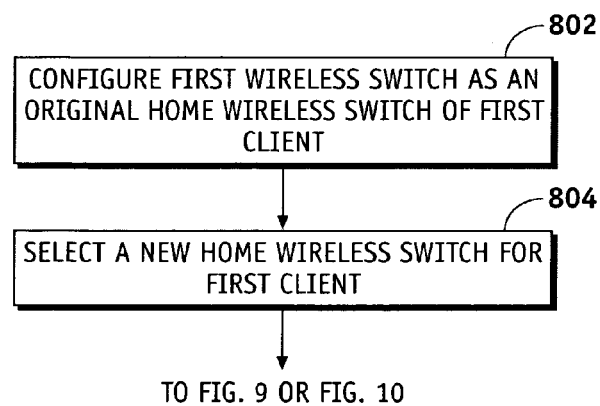
FIG. 8 is a flow chart showing an exemplary method for WLAN load balancing according to one exemplary embodiment.

FIG. 8 is a flow chart showing an exemplary method for load balancing in wireless local area network comprising a plurality of wireless switches 712, 722, 732, 742 configured to support a plurality of clients 702A-702K including a first client 702A according to one exemplary embodiment. Each of the wireless switches 712, 722, 732, 742 can be coupled to each of the other wireless switches 712, 722, 732, 742 via a UDP/IP socket.

At step 802, an original home wireless switch is configured as an initial home wireless switch of the first client. At step 804, the original home wireless switch can select one of a plurality of wireless switches 712, 722, 732, 742 as a new home wireless switch for the first client. Again, the original home wireless switch 732 is assumed to be overloaded with clients 702A-702K or client traffic with respect to the other wireless switches 712, 722, 732, 742 712, 722, 742 such that at least one of the other wireless switches 712, 722, 732, 742 is currently handling less traffic that the original home wireless switch 732. Nevertheless, in a given situation, it should be appreciated that the original home wireless switch 732 could select itself to remain as the home wireless switch if it determines that it is currently the least loaded wireless switch in the WLAN.

Figure 9:
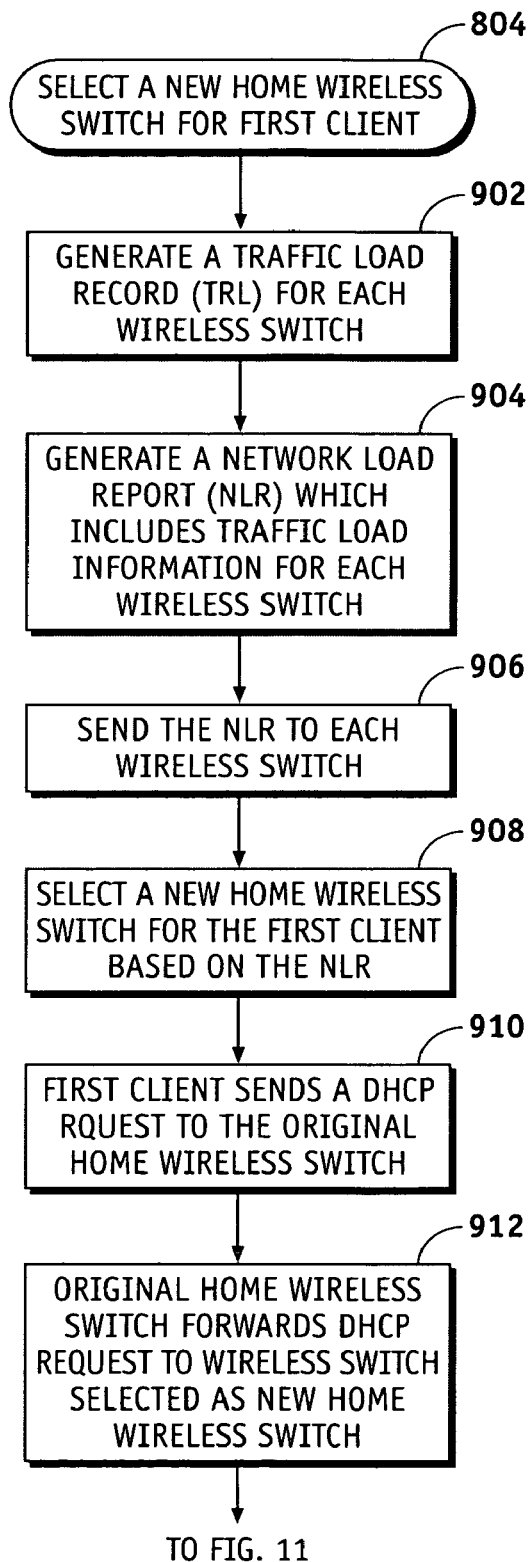
FIG. 9 is a flow chart showing a method for a home wireless switch to select one of a plurality of candidate wireless switches in a WLAN as a new home wireless switch for the first client according to one exemplary embodiment.

FIG. 9 is a flow chart showing a method for a home wireless switch 732 to select one of a plurality of wireless switches 712, 722, 732, 742 in a WLAN as a new home wireless switch for the first client 702A according to one exemplary embodiment. Each wireless switch 712, 722, 732, 742 can be configured to monitor traffic being tunneled to and from the wireless switch.

At step 902, each of the wireless switches 712, 722, 732, 742 generates a traffic load record (TLR). The traffic load record (TLR) for each wireless switch 712, 722, 732, 742 can include a parameter which specifies the number of clients 702A-702K the switch 712, 722, 732, 742 supports as a home switch, a parameter which specifies the number of clients 702A-702K the switch 712, 722, 732, 742 supports as a visited switch, a parameter which specifies traffic volume being tunneled to the switch 712, 722, 732, 742, a parameter which specifies traffic volume being tunneled from the switch 712, 722, 732, 742, and a parameter which specifies traffic volume being transferred by the switch 712, 722, 732, 742.

At step 904, the registration server 730 can generate a network load report (NLR) which includes traffic load information for each of the wireless switches 712, 722, 732, 742. At step 906, the registration server 730 can send the NLR to each of the wireless switches 712, 722, 732, 742. At step 908, the home wireless switch 732 can select one of the wireless switches 712, 722, 732, 742 as a new home wireless switch for the first client 702A based on the NLR and the TLRs for each wireless switch 712, 722, 732, 742. For example, in one embodiment, the original home wireless switch 732 can select one of the wireless switches 712, 722, 732, 742 as a new home wireless switch for the first client 702A by using the NLR to determine which of the wireless switches 712, 722, 732, 742 is currently handling the least amount of traffic, and selecting the wireless switch 712, 722, 732, 742 which is currently handling the least amount of traffic as the new home wireless switch for the first client 702A. In one exemplary implementation, the home wireless switch can use attributes in traffic load records (TLRs) associated with each of the wireless switches 712, 722, 732, 742 to select the wireless switch, which is handling the least amount of traffic, as the new home wireless switch for the first client 702A.

At step 910, the first client 702A sends a DHCP request to the home wireless switch. At step 912, the home wireless switch can forward the DHCP request to the wireless switch selected as the new home wireless switch. Although not shown in FIG. 9, when a new client 702A joins the WLAN, the home wireless switch can redirect a DHCP request received from the new client 702A and send the DHCP request to the wireless switch selected as the new home wireless switch.

Figures 10, 11:
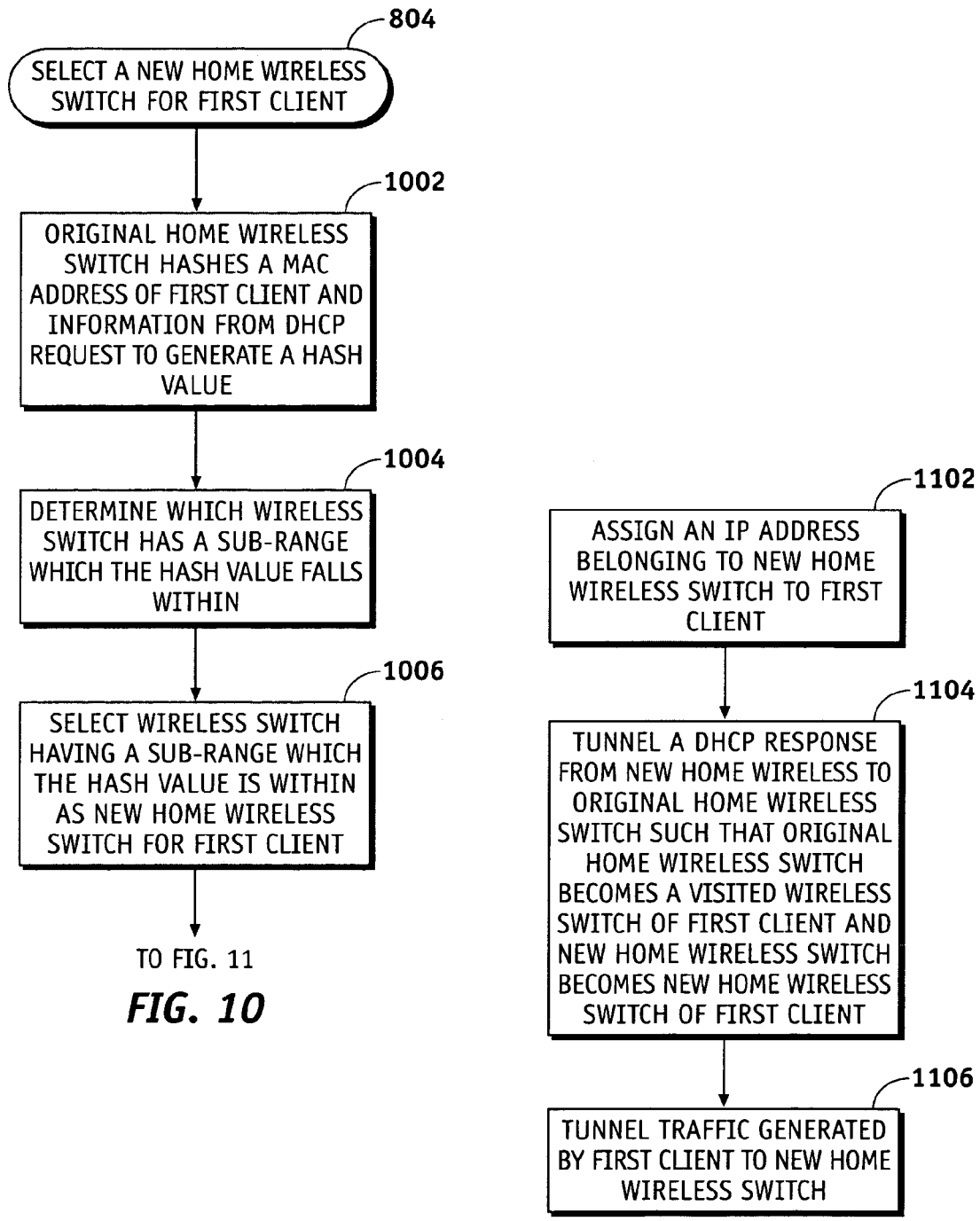
FIG. 10 is a flow chart showing another method for a home wireless switch to select one of a plurality of wireless switches as a new home wireless switch for the first client according to another exemplary embodiment.
FIG. 11 is a flow chart showing a method for tunneling traffic generated by a client to a new home wireless switch to according to one exemplary embodiment.

FIG. 10 is a flow chart showing another method for a home wireless switch to select one of a plurality of wireless switches 712, 722, 732, 742 as a new home wireless switch for the first client 702A according to another exemplary embodiment. In this embodiment, the first client 702A sends a DHCP request to the original home wireless switch. The original home wireless switch can then randomly select one of the plurality of wireless switches 712, 722, 732, 742 as a new home wireless switch for the first client 702A.

For example, this random selection can begin a step 1002 where the original home wireless switch hashes a MAC address of the first client 702A and information from the DHCP request to generate a hash value comprising one of a range of values. The range of values comprises a plurality of sub-ranges, and each of the sub-ranges is associated with a particular wireless switch. At step 1004, the original home wireless switch can determine which one of the wireless switches 712, 722, 732, 742 has a sub-range which the hash value is within. In other words, the hash value falls within the sub-range of the selected wireless switch. At step 1006, the original home wireless switch can select the one of the wireless switches 712, 722, 732, 742 having a sub-range which the hash value falls within as the new home wireless switch.

FIG. 11 is a flow chart showing a method for tunneling traffic generated by a first client 702A to a new home wireless switch to according to one exemplary embodiment. Once the new home wireless switch is selected by the original home wireless switch 732, the original home wireless switch 732 forwards the DHCP request to the wireless switch which was selected as the new home wireless switch. At step 1102, a DHCP server 721 assigns an IP address belonging to the selected wireless switch to the first client 702A. At step 1104, the new home wireless switch tunnels a DHCP response from the selected wireless to the original home wireless switch 732 such that the original home wireless switch 732 becomes a new visited wireless switch of the first client 702A and the selected wireless switch becomes the new home wireless switch of the first client 702A. At step 1106, the new visited wireless switch 732 tunnels traffic generated by the first client 702A to the new home wireless switch.

Referring again to FIG. 3, the registration server 730 can include ports 137, a transceiver 131 comprising a transmitter 132 and a receiver 134, a processor 135, and a database 133. In this embodiment, the registration server 730 is configured to assist with load balancing in the WLAN which comprises a plurality of wireless switches 712, 722, 732, 742 configured to support a plurality of clients 702A-702K. Each of the wireless switches generate a traffic load record (TLR). Selected ports 137 couple the registration server 730 to the wireless switches 712, 722, 732, 742 via IP sockets. The receiver 134 can receive the TLRs from each of the wireless switches 712, 722, 732, 742. The processor 135 can create or generate a network load report (NLR) which includes traffic load information for each of the wireless switches 712, 722, 732, 742. The database 135 can store the TLRs for each of the plurality of wireless switches and the NLR, and the transmitter 132 can communicate or send the NLR to each of the wireless switches 712, 722, 732, 742. In one implementation, the wireless switches 712, 722, 732, 742 comprise a original home wireless switch 732 configured as an initial home wireless switch of a first client 702A and a plurality of "candidate" wireless switches 712, 722, 742 which can be selected by the original home wireless switch 732 as a new home wireless switch.

Referring again to FIG. 4, each of the wireless switches 712, 722, 732, 742 of FIG. 7 can be configured as an initial home wireless switch of the first client 702A and can be embodied to include, for example, a number of ports 147, a transceiver 141 including a transmitter 142 and a receiver 144, a processor 145 and a database 143. Processors 145 in each of the wireless switches 712, 722, 732, 742 can be used to monitor traffic being tunneled to and from the respective wireless switches. One of the ports 147 couple the wireless switches 712, 722, 732, 742 of FIG. 7 to the registration server 730 via IP sockets, while other ports 147 are coupled to UDP/IP sockets which couple each of the wireless switches 712-742 to each of the other wireless switches 712-742. The processor 145 of the wireless switch 732 and the other processors 145 in each of the candidate wireless switches 712, 722, 742 can then use this information to generate a traffic load record (TLR), and can use a transmitter 142 to send their respective TLRs to a registration server 730. The registration server 730 can use the TLRs to create or generate a network load report (NLR) which includes traffic load information for each of the wireless switches 712, 722, 732, 742.

The receiver 144 of each of the wireless switches 712, 722, 732, 742 can receive the NLR which includes traffic load information for each of the wireless switches, and the processor 145 of the wireless switch 732 can use the NLR and attributes in the TLRs associated with each of the wireless switches 712, 722, 732, 742, to select one of the candidate wireless switches 712, 722, 742 as a new home wireless switch for the first client 702A. In one implementation, the processor 145 of the wireless switch 732 can select one of the candidate wireless switches 712, 722, 742 as a new home wireless switch when traffic at the original home wireless switch exceeds a predefined traffic load threshold (TLT). In one embodiment, the processor 145 of the wireless switch 732 can determine which one of the candidate wireless switches 712, 722, 742 which is handling the least amount of traffic based on attributes in traffic load records (TLRs) associated with each of the candidate wireless switches 712, 722, 742, and select that candidate wireless switch as the new home wireless switch for the first client.

In other embodiments, the processor 145 of the wireless switch 732 can randomly select one of the wireless switches 712, 722, 732, 742 as a new home wireless switch. For example, to randomly select one of the wireless switches 712, 722, 732, 742 as a new home wireless switch, the processor 145 of the wireless switch 732 can include a hashing module (not shown) and a selector module (not shown). The hashing module can hash a MAC address of the first client and information from the DHCP request to generate a hash value. The hash value can take on a value which falls within a range of values. The hashing module can split the range of values into a plurality of sub-ranges. The processor can randomly assign each of the sub-ranges to a particular wireless switch 712, 722, 732, 742. The selector module can then select one of the candidate wireless switches as a new home wireless switch based on the hash value such that the hash value falls within the sub-range of the one of the wireless switches 712, 722, 732, 742 which is selected as the new home wireless switch for the client 702A.

Each of the wireless switches 712, 722, 732, 742 can be coupled to each of the other wireless switches 712, 722, 732, 742 via a UDP/IP socket. When the first client 702A sends a DHCP request received by the receiver 144 of the wireless switch 732, the transmitter 142 of the wireless switch 732 forwards the DHCP request to the wireless switch selected as the new home wireless switch. When a new client 702B joins the WLAN and sends a DHCP request to the original home wireless switch 732, the processor 145 of the wireless switch 732 redirects a DHCP request received from the new client 702B, and the transmitter 142 of the wireless switch 732 sends the DHCP request to the candidate wireless switch selected as the new home wireless switch. At this point, an IP address belonging to the selected candidate wireless switch is assigned to the client 702A, and the new home wireless switch tunnels a DHCP response to the original home wireless switch 732 such that the original home wireless switch 732 becomes a visited wireless switch of the client 702A and the selected candidate wireless switch becomes the new home wireless switch of the client 702A.

Figure 12:
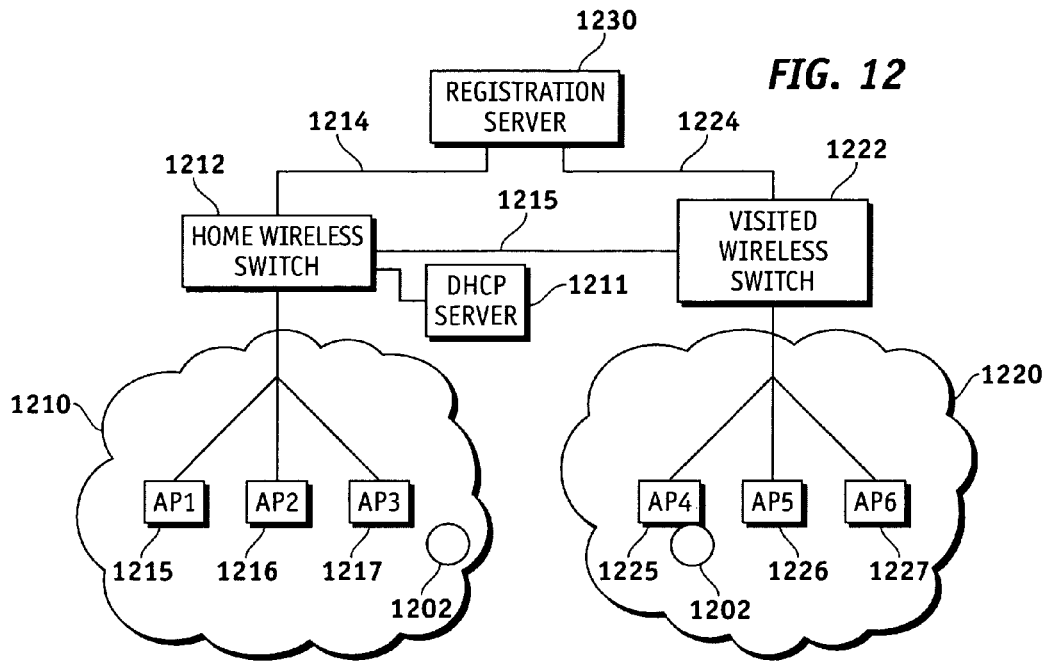
FIG. 12 is a block diagram of a WLAN according to one exemplary embodiment which implements a registration server and a home wireless switch supporting a first subnet and a visited wireless switch supporting a second subnet.

FIG. 12 is a block diagram of a WLAN according to one exemplary embodiment which implements a registration server 1230 and a home wireless switch 1212 supporting a first subnet 1210 and a visited wireless switch 1222 supporting a second subnet 1220. Although FIG. 12 shows two wireless switches 1212, 1222 and two subnets 1210, 1220, it should be appreciated that more than two switches and subnets can be implemented in the WLAN. It should also be appreciated that while FIG. 12 shows a single client 1202, more than one client is typically present in the WLAN. Typically, in a given WLAN there are a number of active clients. In this example, the first subnet 1210 would typically support a group of the active clients having client IP addresses within the first subnet 1210, and the second subnet 1220 would typically supports another group of the active clients having client IP addresses within the second subnet 1220. In addition, in FIG. 12, each subnet 1210, 1220 is shown as comprising three access points (APs) 1215-1217 and 1225-1227, however, any number of APs could be implemented within a subnet.

As used herein, the terms "access point (AP)" or "access port (AP)" refer to a station that transmits and receives data (sometimes referred to as a transceiver). An access point connects users to other users within the network and also can serve as the point of interconnection between the WLAN and a fixed wire network. Each access point can serve multiple users within a defined network area. As a client moves beyond the range of one access point, the client can be automatically handed over to the next AP. A WLAN may only require a single access point. The number of APs in a given subnet generally increases with the number of network users and the physical size of the network.

The home wireless switch 1212 supports a first VLAN comprising a first subnet 1210 which includes access points (AP1) 1215, (AP2) 1216, and (AP3) 1217. All clients on the first VLAN have IP addresses in the first subnet 1210. Tunnels couple the access points (AP1) 1215, (AP2) 1216, and (AP3) 1217 to the home wireless switch 1212. The home wireless switch 1212 has first configuration information comprising a first IP address and a list of first subnets (IP domains) supported by the home wireless switch 1212. The home wireless switch 1212 registers with the registration server 1230 by communicating the first configuration information to the registration server 1230 over the first IP socket 1214. The client 1202 is initially associated with first subnet 1210 communicating with the home wireless switch 1212 through the AP3 1217. The client 1202 has a client IP address from within the first subnet 1210. The client 1202 eventually roams into the second subnet 1220 where it communicates with the visited virtual wireless switch 1222 through the access port (AP4) 1225.

Similarly, the visited wireless switch 1222 supports a second VLAN comprising a second subnet 1220 which includes access points (AP4) 1225, (AP5) 1226, and (AP6) 1227. All clients on the second VLAN have IP addresses in the second subnet 1220. Tunnels couple the access points (AP4) 1225, (AP5) 1226, and (AP6) 1227 to the visited wireless switch 1222. The visited wireless switch 1222 has second configuration information comprising a second IP address and a list of second subnets (IP domains) supported by the visited wireless switch 1222. The visited wireless switch 1222 registers with the registration server 1230 by communicating the second configuration information to the registration server 1230 over the second IP socket 1224.

Because the IP address of the registration server is configured on each of the wireless switches, each of the wireless switches can use the IP address during registration to open an IP socket to the registration server. In this example, a first IP socket 1214 can be provided which couples the home wireless switch 1212 and the registration server 1230, and a second IP socket 1224 between the visited wireless switch 1222 and the registration server 1230.

A database 133 in the registration server 1230 stores the associated configuration information for each of the plurality of wireless switches.

Each of the wireless switches also communicates registration information for each active client to the registration server 1230. The registration server 1230 can use the registration information to create an active client list (ACL). The active client list comprises a record for each active client 1202 in the WLAN. The record of each client 1202 comprises a number of attributes, for instance, a MAC address of the client, a client IP address of the client, a home switch of the client, a visited switch of the client, inactivity timers for the home switch and the visited switch and location information. The registration server 1230 can send a copy of the active client list (or a portion of the active client list) to each wireless switch in the WLAN.

In one embodiment, the registered wireless switches can periodically send updates regarding registration information for each active client to the registration server 1230. The registration server 1230 can use these updates to create an updated active client list. Whenever the registration server 1230 receives updated registration information (or new registration information from a new switch joining the network), the registration server 1230 can then send the updates of the active client list to each wireless switch as the updates are received from the wireless switches.

As will be described below, when the client roams from its original home subnet to a visited subnet supported by a visited wireless switch, the active client list can be used by each of the wireless switches to allow a client to keep its original TCP/IP or UDP/IP connection and its original client IP address assigned by its home wireless switch.

The active client list includes a record for the client 1202 which is based on the first configuration information. This record of comprises a MAC address of the client 1202, the client IP address of the client, the home wireless switch 1212 of the client, the visited wireless switch 1222 of the client 1202, inactivity timers for the home wireless switch 1212 and the visited wireless switch 1222. This record can be periodically updated using updates received from the wireless switch. A database 133 in the registration server 1230 can store the first configuration information, second configuration information, and the active client list.

Because the home wireless switch 1212 and the visited wireless switch 1222 are registered on the registration server 1230, a UDP/IP tunnel 1215 can be created which couples the home wireless switch 1212 and the visited wireless switch 1222. Each of the wireless switches can use configuration information from the wireless switch list to open a UDP/IP tunnel or socket to the other wireless switch. As will be explained in greater detail below, this tunnel allows the client 1202 to maintain the client's IP address from its home wireless switch 1212 when the client 1202 roams from the home wireless switch 1212 and the visited wireless switch 1222.

A protocol can be implemented which allows a DHCP server 1211 to assign the original client IP address to the client even when the client 1202 roams from the home wireless switch 1212 to the visited wireless switch 1222.

When the client 1202 begins to roam to the visited wireless switch 1222, as the client 1202 approaches the visited wireless switch 1222, the client 1202 hears a new beacon sent out by an access port (AP) 1225 connected to the visited wireless switch 1222. The new beacon has a new BSSID (MAC address) different from the one used by access port (AP3) 1217 connected to the home wireless switch 1212. As such, the client 1202 802.11 authenticates with the visited wireless switch 1222, 802.11 associates with the visited wireless switch 1222, 802.1x authenticates with the visited wireless switch 1222 and issues a Dynamic Host Configuration Protocol (DHCP) request. Once the client 1202 802.11 authenticates and 802.11 associates with the visited wireless switch 1222, the client 1202 can continue its existing TCP/IP connection.

To allow for layer 3 roaming between the home wireless switch 1212 and the visited wireless switch 1222, it would be desirable to send a Dynamic Host Configuration Protocol (DHCP) request to the client's home wireless switch 1212 since this can allow the client 1202 to keep its original client IP address. Because the ACL is sent to each wireless switch, each switch has information about all active clients in the network. The visited wireless switch 1222 can obtain the client IP address from the registration information that was sent to the registration server 1230 by the home wireless switch 1212 when the client gets its IP address from the home wireless switch 1212. For example, the visited wireless switch 1222 can search the record of the client 1202 to get the MAC address of the client 1202. The visited wireless switch 1222 can use the MAC address of the client 1202 to determine that the client IP address belongs to the first subnet 1210 and that the client 1202 was originally associated with the home wireless switch 1212. Thus, the visited wireless switch 1222 knows that the client 1202 was initially associated with the home wireless switch 1212 and that it had a client IP address belonging to the first subnet 1210.

The visited wireless switch 1222 can then relays the DHCP request to the home wireless switch 1212 through the tunnel 1215, and the home wireless switch 1212 passes the DHCP request to the DHCP server 1211. The DHCP server 1211 re-assigns the same original client IP address to the client 1202. Because the client 1202 maintains its original client IP address from the home switch, the client 1202 does not need to re-establish its connection. This can prevent the session from dropping. The home wireless switch 1212 forwards a Dynamic Host Configuration Protocol (DHCP) response to the visited wireless switch 1222 and the client 1202.

When the client 1202 sends IP packets to the network, the IP packets will go to the visited wireless switch 1222. The visited wireless switch 1222 can then forward any IP packets it receives through the tunnel 1215 to the home wireless switch 1212 which can forward the IP packets to a router. Likewise, for outbound packets destined to the client IP address, the home wireless switch 1212 can forward the outbound IP packets it receives to the client 1202 through the visited wireless switch 1222.

In one embodiment, if the client 1202 comprises a WPA2 client, then the WPA2 client 1202 is pre-authenticated with the visited wireless switch 1222 to achieve layer 3 mobility with low latency. If the client uses IPSec, terminated on the home switch and no 802.11 encryptions, then the client could 802.11 re-authenticate and search the ACL to get the home wireless switch 1212 from client's MAC address. This can allow all packets from the client 1202 to be forwarded to the home wireless switch 1212. Otherwise the client will 802.11 re-authenticate, go through dot1.x authentication, four way and two handshake to generate new transient keys and then continue with existing TCP or UDP sessions. The dot1.x authentication involves a RADIUS server and the latency can depend on type of the inter-authentication method (PEAP, TTLS, TLS).

Figure 13:
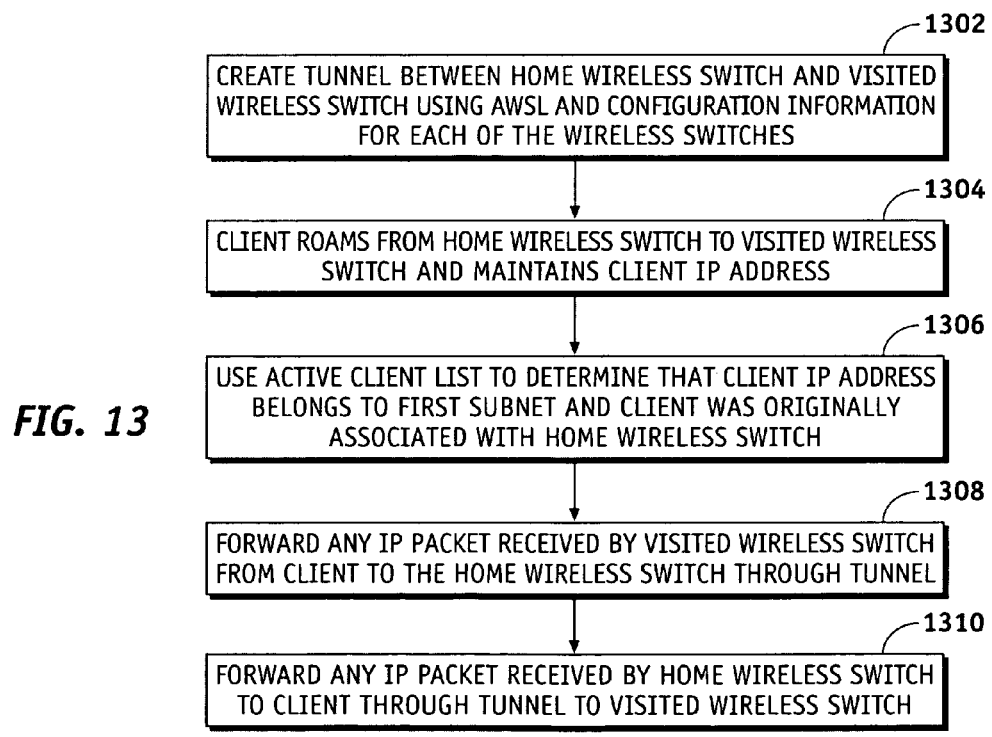
FIG. 13 is a flow chart showing an exemplary method for allowing a client, initially associated with a home wireless switch and having a client IP address from within a first subnet, to roam from the home wireless switch to a visited wireless switch configured to support a second subnet according to one exemplary embodiment.

FIG. 13 is a flow chart showing an exemplary method for allowing a client 1202, initially associated with a home wireless switch 1212 and having a client IP address from within a first subnet 1210, to roam from the home wireless switch 1212 to a visited wireless switch 1222 configured to support a second subnet 1220 according to one exemplary embodiment. This method can be used, for example, in a WLAN to allow a client 1202 to keep its client IP address and maintain IP connectivity while roaming between the first subnet 1210 and the second subnet 1220.

At step 1302, a tunnel is created or opened between the home wireless switch 1212 to the visited wireless switch 1222 by using the AWSL and configuration information for the home wireless switch 1212 to the visited wireless switch 1222. At step 1304, the client 1202 roams from the home wireless switch 1212 to the visited wireless switch 1222. The client 1202 can keep its original client IP address and maintain IP connectivity while roaming from the first subnet 1210 to the second subnet 1220 using techniques which will now be described with reference to FIG. 14.

Figure 14:
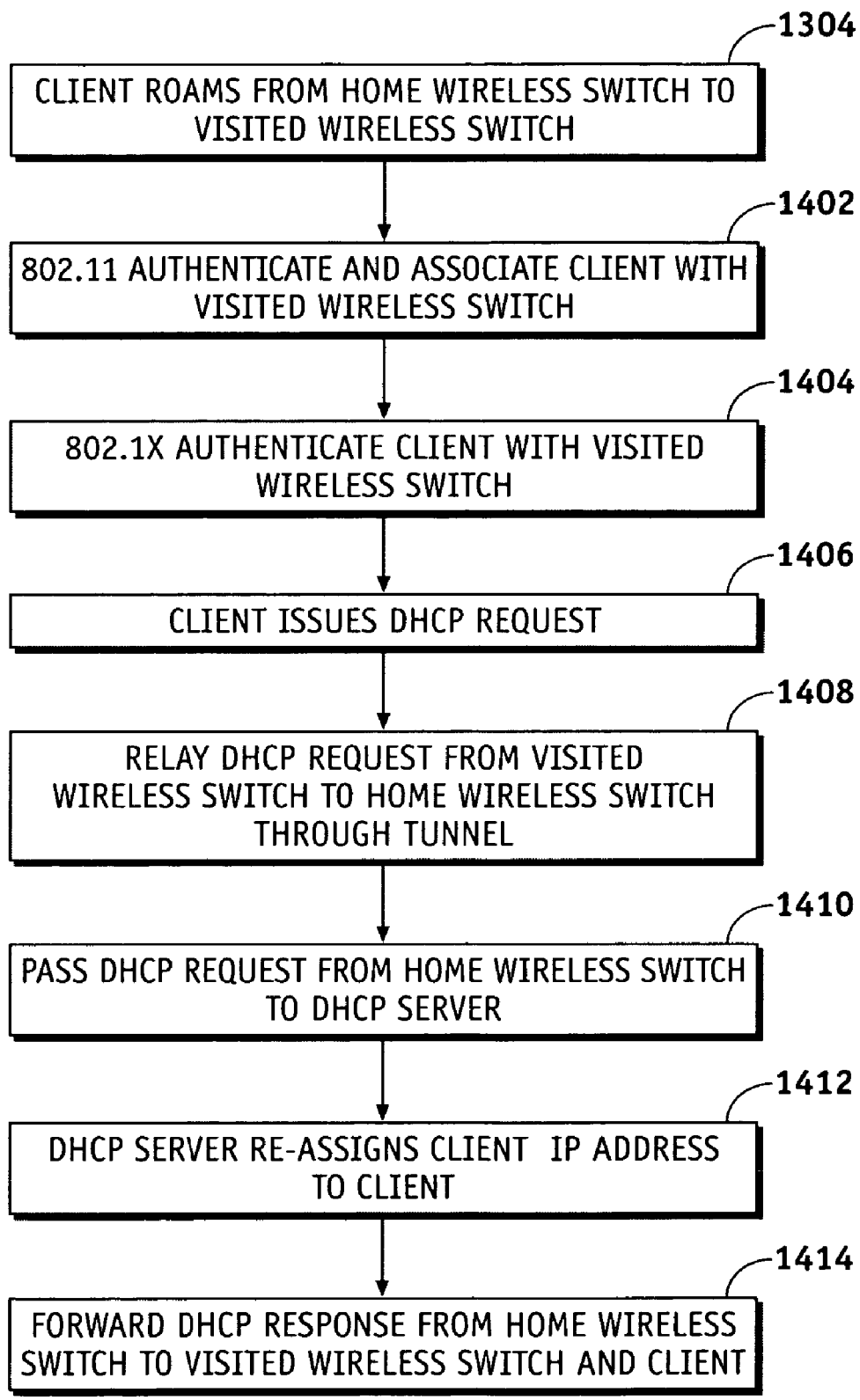
FIG. 14 is a flow chart showing exemplary message exchanges between the home wireless switch which supports a first subnet and the visited wireless switch which supports a second subnet to allow the client to maintain a client IP address when the client roams to the second subnet according to one exemplary embodiment.

FIG. 14 is a flow chart showing exemplary message exchanges between the home wireless switch 1212, which supports a first subnet 1210, and the visited wireless switch 1222, which supports a second subnet 1220, to allow the client 1202 to maintain its original client IP address when the client 1202 roams to the second subnet 1220. At step 1402, the client 1202 is 802.11 authenticated and associated with the visited wireless switch 1222, and at step 1404, 802.1x authenticated with the visited wireless switch 1222. At step 1406, the client 1202 issues a Dynamic Host Configuration Protocol (DHCP) request which is relayed, at step 1408, from the visited wireless switch 1222 to the home wireless switch 1212 through the tunnel 1215. At step 1410, the DHCP request can then be passed from the home wireless switch 1212 to the DHCP server 1211. At step 1412, the DHCP server 1211 re-assigns the client IP address to the client, and at step 1414, a Dynamic Host Configuration Protocol (DHCP) response can be forwarded from the home wireless switch 1212 to the visited wireless switch 1222 and the client 1202.

Referring again to FIG. 13, at step 1306, the active client list can be used to determine that the client IP address belongs to the first subnet 1210 and that the client 1202 was originally associated with the home wireless switch 1212. The visited wireless switch 1222 can obtain the client IP address from the registration information sent to the visited wireless switch 1222 by registration server 1230 by the home wireless switch 1212 when the client gets its IP address from the home wireless switch. At step 1308, any IP packet sent from the client 1202 and received by the visited wireless switch 1222 can be forwarded to the home wireless switch 1212 through the tunnel 1215, and, at step 1310, any IP packet received by the home wireless switch 1212 can be forwarded through the tunnel 1215 to the visited wireless switch 1222 which forwards the IP packet to the client 1202.

Referring again to FIG. 3, some of the ports 137 can couple the registration server 130 to the home wireless switch 1212 and the visited wireless switch 1222. The receiver 134 can receive registration information associated with each client from each of the wireless switches. The processor 135 can create an active client list (ACL) using the registration information from each client. The transmitter 132 can send a copy of the ACL to each wireless switch in the WLAN.

Referring again to FIG. 4, one of the ports 147 of the home wireless switch 1212 can be coupled to one of the ports 137 of the visited wireless switch 1212 via the UDP/IP tunnel. To enable the client to maintain the client IP address when the client roams from the home wireless switch 1212 and the visited wireless switch 1222, the client 1202 802.11 authenticates with the visited wireless switch 1222, 802.11 associates with the visited wireless switch 1222, 802.1x authenticates with the visited wireless switch 1222 and issues a Dynamic Host Configuration Protocol (DHCP) request to the visited wireless switch 1222. The receiver 144 of the home wireless switch can receive the DHCP request from the visited wireless switch 122 through the tunnel, and the transmitter 142 of the home wireless switch 1212 can send the DHCP request to a Dynamic Host Configuration Protocol (DHCP) server 1211 which re-assigns the client IP address to the client 1202. The transmitter 142 of the home wireless switch can send a DHCP response to the visited wireless switch and the client. The receiver 144 of the visited wireless switch 1222 can receive the DHCP response from the home wireless switch 1212.

The receiver 144 of the visited wireless switch 1222 can receive an active client list from the registration server 1230, and the processor 145 of the visited wireless switch 1222 can use the active client list to determine that the client IP address belongs to the first subnet 1210 and that the client 1202 was originally associated with the home wireless switch 1212. The processor 145 of the visited wireless switch 1222 obtains the client IP address from the registration information sent to the registration server 1230 by the by the home wireless switch 1212 when the client gets its IP address from the home wireless switch 1212. The processor 145 of the visited wireless switch 1222 can search the record associated with the client 1202 to get the home wireless switch 1212 from the MAC address of the client 1202. The transmitter 142 of the visited wireless switch 1222 can send registration information for each client in the second subnet to the registration server. The receiver 144 of the visited wireless switch 1222 can receive, after the client 1202 has roamed from the home wireless switch 1212 to the visited wireless switch 1222, an IP packet sent from the client 1202. The transmitter 142 of the visited wireless switch 1222 can then send the IP packet through the UDP/IP tunnel to the home wireless switch 1212. The receiver 144 of the home wireless switch can be coupled to the first port and can receive, after the client has roamed from the home wireless switch to the visited wireless switch, an IP packet sent from the visited wireless switch through the UDP/IP tunnel. This IP packet originates at the client.

Another one of the ports 147 can be coupled to the registration server. The receiver 144 of the home wireless switch can receive an active client list from the registration server. The processor 145 of the home wireless switch can use the active client list to determine that the client is now associated with the home wireless switch. The receiver 144 of the home wireless switch can receive a second IP packet addressed to the client. The transmitter 142 of the home wireless switch, which is coupled to the port, can send the second IP packet to the visited wireless switch through the UDP/IP tunnel. The visited wireless switch sends the second IP packet to the client. The receiver 144 of the visited wireless switch 1222 can receive a second IP packet for the client 1202 sent from the home wireless switch 1212 through the UDP/IP tunnel.

Thus, numerous embodiments have been disclosed above which can provide techniques which support layer 3 IP roaming and allow a client to keep its original, pre-roam IP address and TCP/IP connection from its home subnet when the client undergoes a layer 3 roam to a new subnet. These techniques can help reduce the likelihood of dropped calls or sessions without requiring modification to the client software.

Moreover, other embodiments have been disclosed above which can provide techniques which allow for load balancing between wireless switches in a WLAN by allowing a home wireless switch to determine that it no longer needs to support a client when the client moves away from its home switch. In some embodiments, techniques are provided which allow the home switch to determine that it is no longer the best home switch for a particular client.

The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical. Furthermore, numerical ordinals such as "first," "second," "third," etc. simply denote different singles of a plurality and do not imply any order or sequence unless specifically defined by the claim language.

Furthermore, words such as "connect" or "coupled to" used in describing a relationship between different elements do not imply that a direct physical connection must be made between these elements. For example, two elements may be connected to each other physically, electronically, logically, or in any other manner, through one or more additional elements, without departing from the scope of the invention. Thus, to the extent the description refers to certain features being "connected" or "coupled" together, unless expressly stated otherwise, "connected" or "coupled" means that one feature is directly or indirectly connected or coupled to another feature, and not necessarily mechanically. Although drawings depict exemplary arrangements of elements, additional intervening elements, devices, features, or components may be present in an actual embodiment assuming that the functionality of the circuit is not adversely affected. The connecting lines shown in the various figures represent example functional relationships and/or physical couplings between the various elements. Many alternative or additional functional relationships or physical connections may be present in a practical embodiment or implementation.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should also be understood that various changes can be made in the function and arrangement of elements without departing from the scope of the invention as set forth in the appended claims and the legal equivalents thereof. Thus, the present invention is not intended to be limited to the embodiments shown herein but is to be accorded the widest scope consistent with the principles and novel features disclosed herein.

What is claimed is:

1. A wireless local area network, comprising:
  a plurality of clients including a first client;
  a plurality of access points including a first access point; and
  a mesh network of wireless switches each being directly coupled to an access point and each being coupled to each of the other wireless switches via an IP tunnel, wherein each of the wireless switches in the mesh network of wireless switches is configured to: monitor traffic being tunneled to and from the wireless switch, generate a traffic load record (TLR) comprising traffic load information for clients associated with that wireless switch, and transmit the TLR to the registration server;
  a registration server, coupled to each of the wireless switches via IP tunnels, and configured to: receive the TLRs from each of the wireless switches, generate a network load report (NLR) comprising traffic load information for each of the wireless switches, and send the NLR to each of the wireless switches,
  wherein the mesh network of wireless switches comprises:
  a plurality of candidate wireless switches each being directly coupled to at least one access point; and
  an initial home wireless switch directly coupled to the first access point, and being configured to support the first client such that the first client communicates with the initial home wireless switch via the first access point, wherein the initial home wireless switch is configured to determine, based on the NLR when traffic at the initial home wireless switch exceeds a predefined traffic load threshold (TLT), which of the candidate wireless switches is currently handling the least amount of traffic, and to select the one of the candidate wireless switches that is currently handling the least amount of traffic as a new home wireless switch for the first client, and to tunnel traffic generated by the first client to the new home wireless switch.

2. The wireless local area network of claim 1, wherein the initial home wireless switch selects the one of the candidate wireless switches handling the least amount of traffic based on attributes in traffic load records (TLRs) associated with each of the candidate wireless switches.

3. The wireless local area network of claim 1, wherein the initial home wireless switch is configured to select one of the candidate wireless switches as a new home wireless switch for the first client based on the NLR and the TLRs for each wireless switch.

4. The wireless local area network of claim 1, wherein each wireless switch maintains an active client list.

5. The wireless local area network of claim 1, wherein the traffic load record (TLR) for each wireless switch comprises:
  a first parameter which specifies the number of clients the switch supports as a home switch;
  a second parameter which specifies the number of clients the switch supports as a visited switch;
  a third parameter which specifies traffic volume being tunneled to the switch;
  a fourth parameter which specifies traffic volume being tunneled from the switch; and
  a fifth parameter which specifies traffic volume being transferred by the switch.

6. The wireless local area network of claim 1, wherein the initial home wireless switch continuously determines which of the candidate wireless switches is to be selected as a new home wireless switch.

7. The wireless local area network of claim 1, wherein the first client sends a DHCP request to the initial home wireless switch, and wherein the initial home wireless switch forwards the DHCP request to the candidate wireless switch selected as a new home wireless switch.

8. The wireless local area network of claim 1, when a new client joins the WLAN and sends a DHCP request to the initial home wireless switch, wherein the initial home wireless switch redirects a DHCP request received from the new client to the candidate wireless switch selected as a home wireless switch.

9. The wireless local area network of claim 1, further comprising:
   a DHCP server, coupled to the new home wireless switch, configured to assign an IP address belonging to the new home wireless switch to the first client, and
   wherein the new home wireless switch tunnels a DHCP response to the initial home wireless switch such that the initial home wireless switch becomes a visited wireless switch of the first client.

10. A method of load balancing in wireless local area network comprising a plurality of access points, a mesh network of wireless switches comprising an initial home wireless switch and a plurality of candidate wireless switches, wherein each of the wireless switches in the mesh network is coupled to the other wireless switches via IP tunnels and directly coupled to at least one access point, and a plurality of clients including a first client that communicates with the initial home wireless switch via one of the plurality of access points that is directly coupled to the initial home wireless switch, the method comprising:
   generating, at each of the wireless switches, a traffic load record (TLR) and communicating the TLR to a registration server, wherein each TLR comprises traffic load information for a particular wireless switch;
   generating, at the registration server based on the TLRs, a network load report (NLR) which includes traffic load information for each of the wireless switches, and sending the NLR to each of the wireless switches; and
   selecting one of the candidate wireless switches as a new home wireless switch for the first client based on the NLR;
   determining, by the initial home wireless switch based on the NLR, which one the candidate wireless switches is currently handling the least amount of traffic;
   selecting, at the initial home wireless switch, the candidate wireless switch which is currently handling the least amount of traffic as a new home wireless switch for the first client.

* * * * *

UNITED STATES PATENT AND TRADEMARK OFFICE
CERTIFICATE OF CORRECTION

PATENT NO. : 7,529,203 B2
APPLICATION NO. : 11/139155
DATED : May 5, 2009
INVENTOR(S) : Bajic et al.

It is certified that error appears in the above-identified patent and that said Letters Patent is hereby corrected as shown below:

On the Title Page, in Item (54), in Title, in Column 1, Line 5, delete "(WLANS)" and insert -- (WLANs) --, therefor.

On the Title Page, in Item (56), under "OTHER PUBLICATIONS", in Column 2, Line 2, delete "ITEF," and insert -- IETF, --, therefor.

On the Title Page, in the Drawing Figure, for Tag "910", Line 2, delete "RQUEST" and insert -- REQUEST --, therefor.

On Title Page 2, in Item (56), under "OTHER PUBLICATIONS", in Column 2, Line 3, delete "PCT/SU2007/073917," and insert -- PCT/US2007/073917, --, therefor.

IN THE DRAWINGS

In Fig. 9, Sheet 5 of 8, for Tag "910", Line 2, delete "RQUEST" and insert -- REQUEST --, therefor.

In Column 1, Line 5, delete "(WLANS)" and insert -- (WLANs) --, therefor.

Signed and Sealed this

Thirteenth Day of July, 2010

David J. Kappos
*Director of the United States Patent and Trademark Office*